(12) United States Patent
Khoshnevisan et al.

(10) Patent No.: US 12,484,053 B2
(45) Date of Patent: Nov. 25, 2025

(54) INDICATION OF WHETHER CONFIGURED GRANT PHYSICAL UPLINK SHARED CHANNEL IS TO BE TRANSMITTED

(71) Applicant: QUALCOMM Incorporated, San Diego, CA (US)

(72) Inventors: Mostafa Khoshnevisan, San Diego, CA (US); Tao Luo, San Diego, CA (US); Yi Huang, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 399 days.

(21) Appl. No.: 18/309,647

(22) Filed: Apr. 28, 2023

(65) Prior Publication Data

US 2023/0362926 A1 Nov. 9, 2023

Related U.S. Application Data

(60) Provisional application No. 63/364,327, filed on May 6, 2022.

(51) Int. Cl.
*H04W 72/1268* (2023.01)
*H04W 72/563* (2023.01)

(52) U.S. Cl.
CPC ..... *H04W 72/1268* (2013.01); *H04W 72/563* (2023.01)

(58) Field of Classification Search
CPC .......... H04W 72/1268; H04W 72/563; H04W 72/115
See application file for complete search history.

(56) References Cited

U.S. PATENT DOCUMENTS

| | | | | |
|---|---|---|---|---|
| 12,316,455 | B2 * | 5/2025 | Karaki | H04L 1/1664 |
| 2020/0304230 | A1 * | 9/2020 | Papasakellariou | H04L 5/0094 |
| 2020/0305183 | A1 * | 9/2020 | Papasakellariou | H04L 1/0003 |
| 2021/0160011 | A1 * | 5/2021 | Bang | H04L 5/0055 |
| 2022/0046667 | A1 * | 2/2022 | Sun | H04L 1/1887 |
| 2022/0174722 | A1 * | 6/2022 | Talarico | H04W 72/21 |
| 2023/0024493 | A1 * | 1/2023 | Sridharan | H04L 1/1887 |
| 2023/0199750 | A1 * | 6/2023 | He | H04L 5/0051 370/329 |
| 2024/0163868 | A1 * | 5/2024 | Xiong | H04L 5/0051 |
| 2024/0298320 | A1 * | 9/2024 | Wong | H04W 72/566 |
| 2024/0380558 | A1 * | 11/2024 | Fu | H04L 1/1671 |
| 2025/0125850 | A1 * | 4/2025 | Li | H04W 72/232 |

FOREIGN PATENT DOCUMENTS

EP 4070576 B1 * 1/2024 ............ H04W 16/14

* cited by examiner

*Primary Examiner* — Kenny S Lin
(74) *Attorney, Agent, or Firm* — Harrity & Harrity, LLP

(57) ABSTRACT

Various aspects of the present disclosure generally relate to wireless communication. In some aspects, a user equipment (UE) may transmit an indication of whether a configured grant physical uplink shared channel (CG-PUSCH) is to be transmitted, the indication being transmitted prior to a first configured symbol of the CG-PUSCH. The UE may transmit a communication in accordance with the indication. Numerous other aspects are described.

30 Claims, 15 Drawing Sheets

INDICATION OF WHETHER CONFIGURED GRANT PHYSICAL UPLINK SHARED CHANNEL IS TO BE TRANSMITTED

CROSS-REFERENCE TO RELATED APPLICATION

This Patent Application claims priority to U.S. Provisional Patent Application No. 63/364,327, filed on May 6, 2022, entitled "INDICATION OF WHETHER CONFIGURED GRANT PHYSICAL UPLINK SHARED CHANNEL IS TO BE TRANSMITTED," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for indication of whether a configured grant physical uplink shared channel (CG-PUSCH) is to be transmitted.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include transmitting an indication of whether a configured grant physical uplink shared channel (CG-PUSCH) is to be transmitted, the indication being transmitted prior to a first configured symbol of the CG-PUSCH. The method may include transmitting a communication in accordance with the indication.

Some aspects described herein relate to a method of wireless communication performed by a network node. The method may include receiving an indication of whether a CG-PUSCH is to be transmitted, the indication being received prior to a first configured symbol of the CG-PUSCH. The method may include receiving a communication in accordance with the indication.

Some aspects described herein relate to a UE for wireless communication. The user equipment may include a memory and one or more processors coupled to the memory. The one or more processors may be configured to transmit an indication of whether a CG-PUSCH is to be transmitted, the indication being transmitted prior to a first configured symbol of the CG-PUSCH. The one or more processors may be configured to transmit a communication in accordance with the indication.

Some aspects described herein relate to a network node for wireless communication. The network node may include a memory and one or more processors coupled to the memory. The one or more processors may be configured to receive an indication of whether a CG-PUSCH is to be transmitted, the indication being received prior to a first configured symbol of the CG-PUSCH. The one or more processors may be configured to receive a communication in accordance with the indication.

Some aspects described herein relate to a non-transitory computer-readable medium that stores a set of instructions for wireless communication by a UE. The set of instructions, when executed by one or more processors of the UE, may cause the UE to transmit an indication of whether a CG-PUSCH is to be transmitted, the indication being transmitted prior to a first configured symbol of the CG-PUSCH. The set of instructions, when executed by one or more processors of the UE, may cause the UE to transmit a communication in accordance with the indication.

Some aspects described herein relate to a non-transitory computer-readable medium that stores a set of instructions for wireless communication by a network node. The set of instructions, when executed by one or more processors of the network node, may cause the network node to receive an indication of whether a CG-PUSCH is to be transmitted, the indication being received prior to a first configured symbol of the CG-PUSCH. The set of instructions, when executed by one or more processors of the network node, may cause the network node to receive a communication in accordance with the indication.

Some aspects described herein relate to an apparatus for wireless communication. The apparatus may include means for transmitting an indication of whether a CG-PUSCH is to be transmitted, the indication being transmitted prior to a first configured symbol of the CG-PUSCH. The apparatus may include means for transmitting a communication in accordance with the indication.

Some aspects described herein relate to an apparatus for wireless communication. The apparatus may include means for receiving an indication of whether a CG-PUSCH is to be transmitted, the indication being received prior to a first configured symbol of the CG-PUSCH. The apparatus may include means for receiving a communication in accordance with the indication.

Aspects generally include a method, apparatus, system, computer program product, non-transitory computer-readable medium, user equipment, network node, wireless communication device, and/or processing system as substantially described herein with reference to and as illustrated by the drawings and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
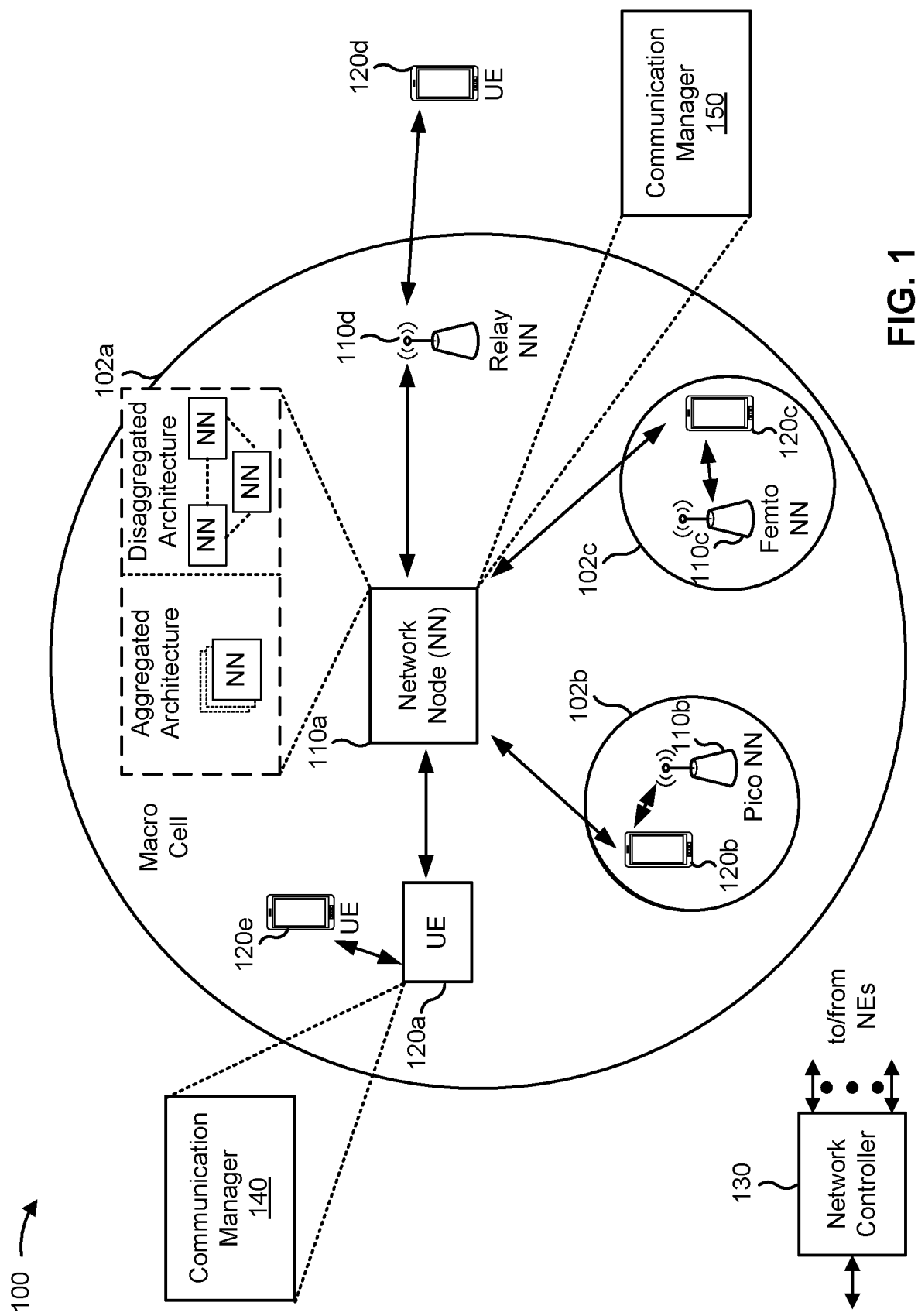
FIG. 1 is a diagram illustrating an example of a wireless network, in accordance with the present disclosure.

Various aspects relate generally to wireless communication. Some aspects more specifically relate to an indication of whether or not an occasion of configured uplink communication will be utilized prior to the occasion. In some examples, a user equipment may transmit an indication, prior to a first configured symbol (e.g., an earliest time resource) of a configured grant physical uplink shared channel (CG-PUSCH), of whether or not the CG-PUSCH will be transmitted. The UE may then transmit a communication in accordance with (e.g., consistent with) the indication. The indication, received by a network node, may enable the network node to receive the communication from the UE in accordance with (e.g., consistent with) the indication. In some aspects, the received indication may allow the network node to determine whether or not the CG-PUSCH will be transmitted and/or may identify which channel, of the CG-PUSCH or a second uplink channel, is transmitted according to the indication. Thus, the number of blind decoding hypotheses at the network node is reduced because the network node has received information indicating the channel, which reduces complexity at the network node. Furthermore, the indication may enable or improve the usage of overlapped CG-PUSCHs and other channels by some network nodes 110 in frequency ranges utilizing beamforming.

Particular aspects of the subject matter described in this disclosure can be implemented to realize one or more of the following potential advantages. In some examples, by transmitting the indication, the UE may enable the network node to receive the communication using a reduced amount of blind decoding relative to if no indication was transmitted, which can conserve processing and reception resources of the network node. Furthermore, by providing the indication for frequency ranges utilizing beamforming, the UE can identify which channel (and therefore which beam) will be transmitted, thereby eliminating the need to simultaneously monitor multiple beams at the network node.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100. The wireless network 100 may be or may include elements of a 5G (for example, NR) network or a 4G (for example, Long Term Evolution (LTE)) network, among other examples. The wireless network 100 may include one or more network entities, such as one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), or other entities. A network node 110 is an example of a network entity that communicates with UEs 120. As shown, a network node 110 may include one or more network entities. For example, a network node 110 may be an aggregated network entity, meaning that the aggregated network node is configured to utilize a radio protocol stack that is physically or logically integrated within a single RAN node (for example, within a single device or unit). As another example, a network node 110 may be a disaggregated network node (sometimes referred to as a disaggregated network node), meaning that the network node 110 includes two or more non-co-located network nodes. A disaggregated network entity may be configured to utilize a protocol stack that is physically or logically distributed among two or more nodes (such as one or more central units (CUs), one or more distributed units (DUs), or one or more radio units (RUs)).

In some examples, a network node 110 includes an entity that communicates with UEs 120 via a radio access link, such as an RU. In some examples, a network node 110 includes an entity that communicates with other network nodes 110 via a fronthaul link or a midhaul link, such as a DU. In some examples, a network node 110 includes an entity that communicates with other network nodes 110 via a midhaul link or a core network via a backhaul link, such as a CU. In some examples, a network node 110 (such as an aggregated network node 110 or a disaggregated network node 110) may include multiple network entities, such as one or more RUs, one or more CUs, or one or more DUs. A network node 110 may include, for example, an NR network node, an LTE network node, a Node B, an eNB (for example, in 4G), a gNB (for example, in 5G), an access point, or a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 or a network entity subsystem serving this coverage area, depending on the context in which the term is used.

A network node 110 may provide communication coverage for a macro cell, a pico cell, a femto cell, or another type of cell. A macro cell may cover a relatively large geographic area (for example, several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (for example, a home) and may allow restricted access by UEs 120 having association with the femto cell (for example, UEs 120 in a closed subscriber group (CSG)). A network node 110 for a macro cell may be referred to as a macro network entity. A network node 110 for a pico cell may be referred to as a pico network entity. A network node 110 for a femto cell may be referred to as a femto network entity or an in-home network entity. In the example shown in FIG. 1, the network node 110a may be a macro network entity for a macro cell 102a, the network node 110b may be a pico network entity for a pico cell 102b, and the network node 110c may be a femto network entity for a femto cell 102c. A network entity may support one or multiple (for example, three) cells. In some examples, a cell may not necessarily be stationary, and the geographic area of the cell may move according to the location of a network node 110 that is mobile (for example, a mobile network entity).

In some aspects, the term "network node" or "network entity" may refer to an aggregated network node, a disaggregated network node, an integrated access and backhaul (IAB) node, a relay node, or one or more components thereof. For example, in some aspects, "network node" or "network entity" may refer to a CU, a DU, an RU, a Near-Real Time (Near-RT) RAN Intelligent Controller (RIC), or a Non-Real Time (Non-RT) MC, or a combination thereof. In some aspects, the term "network node" or "network entity" may refer to one device configured to perform one or more functions, such as those described herein in connection with the network node 110. In some aspects, the term "network node" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the term "network node" or "network entity" may refer to any one or more of those different devices. In some aspects, the term "network node" or "network entity" may refer to one or more virtual network nodes or one or more virtual network node functions. For example, in some aspects, two or more network node functions may be instantiated on a single device. In some aspects, the term "network node" or "network entity" may refer to one of the network node functions and not another. In this way, a single device may include more than one network node.

The wireless network 100 may include one or more relay stations. A relay station is a network entity that can receive a transmission of data from an upstream station (for example, a network node 110 or a UE 120) and send a transmission of the data to a downstream station (for example, a UE 120 or a network node 110). A relay station may be a UE 120 that can relay transmissions for other UEs 120. In the example shown in FIG. 1, the network node 110d (for example, a relay network entity) may communicate with the network node 110a (for example, a macro network entity) and the UE 120d in order to facilitate communication between the network node 110a and the UE 120d. A network node 110 that relays communications may be referred to as a relay station, a relay network node, a relay network entity, a relay node, or a relay, among other examples.

The wireless network 100 may be a heterogeneous network that includes network nodes 110 of different types, such as macro network entities, pico network entities, femto network entities, or relay network entities. These different types of network nodes 110 may have different transmit power levels, different coverage areas, or different impacts on interference in the wireless network 100. For example, macro network entities may have a high transmit power level (for example, 5 to 40 watts) whereas pico network entities, femto network entities, and relay network entities may have lower transmit power levels (for example, 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU, or may include a CU or a core network device.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (for example, a smart watch, smart clothing, smart glasses, a smart wristband, smart jewelry (for example, a smart ring or a smart bracelet)), an entertainment device (for example, a music device, a video device, or a satellite radio), a vehicular component or sensor, a smart meter/sensor, industrial manufacturing equipment, a global positioning system device, a UE function of a network entity, or any other suitable device that is configured to communicate via a wireless or wired medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a network node, another device (for example, a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (for example, one or more processors) and the memory components (for example, a memory) may be operatively coupled, communicatively coupled, electronically coupled, or electrically coupled.

In general, any number of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (for example, shown as UE 120a and UE 120e) may communicate directly using one or more sidelink channels (for example, without using a network node 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the network node 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With these examples in mind, unless specifically stated otherwise, the term "sub-6 GHz," if used herein, may broadly represent frequencies that may be less than 6 GHz, may be within FR1, or may include mid-band frequencies. Further, unless specifically stated otherwise, the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (for example, FR1, FR2, FR3, FR4, FR4-a, FR4-1, or FR5) may be modified, and techniques described herein are applicable to those modified frequency ranges.

In some aspects, the UE 120 may include a communication manager 140. As described in more detail elsewhere herein, the communication manager 140 may transmit an indication of whether a CG-PUSCH is to be transmitted, the indication being transmitted prior to a first configured symbol of the CG-PUSCH; and transmit a communication in accordance with the indication. Additionally, or alternatively, the communication manager 140 may perform one or more other operations described herein.

In some aspects, the network node 110 may include a communication manager 150. As described in more detail elsewhere herein, the communication manager 150 may receive an indication of whether a CG-PUSCH is to be transmitted, the indication being received prior to a first configured symbol of the CG-PUSCH; and receive a communication in accordance with the indication. Additionally, or alternatively, the communication manager 150 may perform one or more other operations described herein.

Figure 2:
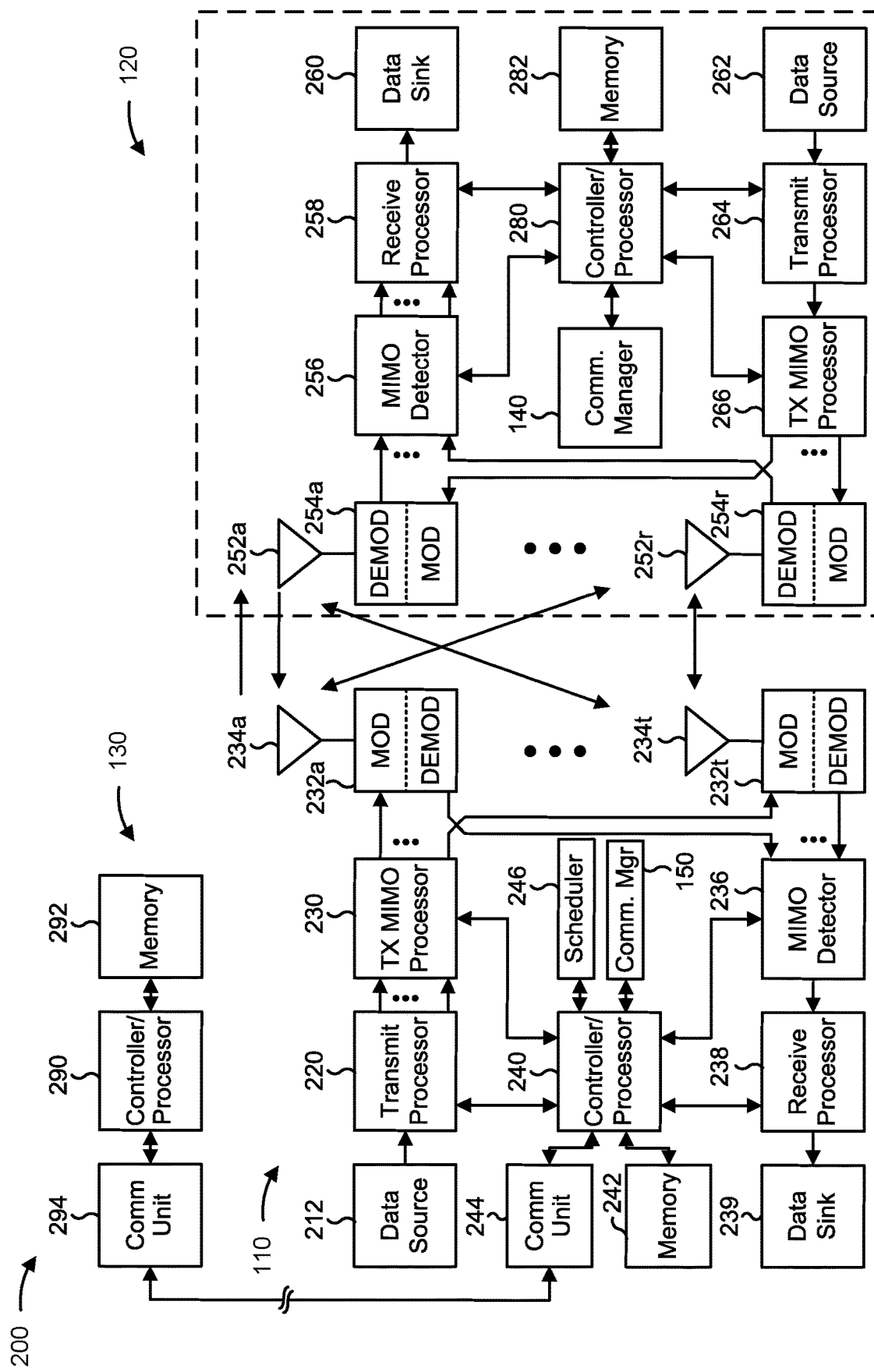
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network entity. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 using one or more channel quality indicators (CQIs) received from that UE 120. The network node 110 may process (for example, encode and modulate) the data for the UE 120 using the MCS(s) selected for the UE 120 and may provide data symbols for the UE 120. The transmit processor 220 may process system information (for example, for semi-static resource partitioning information (SRPI)) and control information (for example, CQI requests, grants, or upper layer signaling) and provide overhead symbols and control symbols. The transmit processor 220 may generate reference symbols for reference signals (for example, a cell-specific reference signal (CRS) or a demodulation reference signal (DMRS)) and synchronization signals (for example, a primary synchronization signal (PSS) or a secondary synchronization signal (SSS)). A transmit (TX) multiple-input multiple-output (MIMO) processor 230 may perform spatial processing (for example, precoding) on the data symbols, the control symbols, the overhead symbols, or the reference symbols, if applicable, and may provide a set of output symbol streams (for example, T output symbol streams) to a corresponding set of modems 232 (for example, T modems), shown as modems 232a through 232t. For example, each output symbol stream may be provided to a modulator component (shown as MOD) of a modem 232. Each modem 232 may use a respective modulator component to process a respective output symbol stream (for example, for OFDM) to obtain an output sample stream. Each modem 232 may further use a respective modulator component to process (for example, convert to analog, amplify, filter, or upconvert) the output sample stream to obtain a downlink signal. The modems 232a through 232t may transmit a set of downlink signals (for example, T downlink signals) via a corresponding set of antennas 234 (for example, T antennas), shown as antennas 234a through 234t.

At the UE 120, a set of antennas 252 (shown as antennas 252a through 252r) may receive the downlink signals from the network node 110 or other network nodes 110 and may provide a set of received signals (for example, R received signals) to a set of modems 254 (for example, R modems), shown as modems 254a through 254r. For example, each received signal may be provided to a demodulator component (shown as DEMOD) of a modem 254. Each modem 254 may use a respective demodulator component to condition (for example, filter, amplify, downconvert, or digitize) a received signal to obtain input samples. Each modem 254 may use a demodulator component to further process the input samples (for example, for OFDM) to obtain received symbols. A MIMO detector 256 may obtain received symbols from the modems 254, may perform MIMO detection on the received symbols if applicable, and may provide detected symbols. A receive processor 258 may process (for example, demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (for example, antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (for example, for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (for example, for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (for example, the controller/processor 280) and the memory 282 to perform aspects of any of the processes described herein.

At the network node 110, the uplink signals from UE 120 or other UEs may be received by the antennas 234, processed by the modem 232 (for example, a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (for example, the controller/processor 240) and the memory 242 to perform aspects of any of the processes described herein.

The controller/processor 240 of the network node 110, the controller/processor 280 of the UE 120, or any other component(s) of FIG. 2 may perform one or more techniques associated with configured grant communication, as described in more detail elsewhere herein. For example, the controller/processor 240 of the network node 110, the controller/processor 280 of the UE 120, or any other component(s) (or combinations of components) of FIG. 2 may perform or direct operations of, for example, process 1200 of FIG. 12, process 1300 of FIG. 13, or other processes as described herein. The memory 242 and the memory 282 may store data and program codes for the network node 110 and the UE 120, respectively. In some examples, the memory 242 and the memory 282 may include a non-transitory computer-readable medium storing one or more instructions (for example, code or program code) for wireless communication. For example, the one or more instructions, when executed (for example, directly, or after compiling, converting, or interpreting) by one or more processors of the network node 110 or the UE 120, may cause the one or more processors, the UE 120, or the network node 110 to perform or direct operations of, for example, process 1200 of FIG. 12, process 1300 of FIG. 13, or other processes as described herein. In some examples, executing instructions may include running the instructions, converting the instructions, compiling the instructions, or interpreting the instructions.

In some aspects, the UE 120 includes means for transmitting an indication of whether a CG-PUSCH is to be transmitted, the indication being transmitted prior to a first configured symbol of the CG-PUSCH; and/or means for transmitting a communication in accordance with the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network node includes means for receiving an indication of whether a CG-PUSCH is to be transmitted, the indication being received prior to a first configured symbol of the CG-PUSCH; and/or means for receiving a communication in accordance with the indication. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described with respect to the blocks may be implemented in a single hardware, software, or combination component or in various combinations of components. For example, the functions described with respect to the transmit processor 264, the receive processor 258, the TX MIMO processor 266, or another processor may be performed by or under the control of the controller/processor 280.

Deployment of communication systems, such as 5G NR systems, may be arranged in multiple manners with various components or constituent parts. In a 5G NR system, or network, a network node, a network entity, a mobility element of a network, a RAN node, a core network node, a network element, a network node, or a network equipment may be implemented in an aggregated or disaggregated architecture. For example, a network node (such as a Node B (NB), an evolved NB (eNB), an NR base station (BS), a 5G NB, an access point (AP), a TRP, or a cell, among other examples), or one or more units (or one or more components) performing network node functionality, may be implemented as an aggregated network node (also known as a standalone network node or a monolithic network node) or a disaggregated network node.

An aggregated network node may be configured to utilize a radio protocol stack that is physically or logically integrated within a single RAN node (for example, within a single device or unit). A disaggregated network node may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, such as a virtual central unit (VCU), a virtual distributed unit (VDU), or a virtual radio unit (VRU), among other examples.

Network node-type operation or network design may consider aggregation characteristics of network node functionality. For example, disaggregated network nodes may be utilized in an IAB network, an open radio access network (O-RAN) (such as the network configuration sponsored by the O-RAN Alliance), or a virtualized radio access network (vRAN), also known as a cloud radio access network (C-RAN) to facilitate scaling of communication systems by separating network node functionality into one or more units that can be individually deployed. A disaggregated network node may include functionality implemented across two or more units at various physical locations, as well as functionality implemented for at least one unit virtually, which can enable flexibility in network design. The various units of the disaggregated network node can be configured for wired or wireless communication with at least one other unit of the disaggregated network node.

Figure 3:
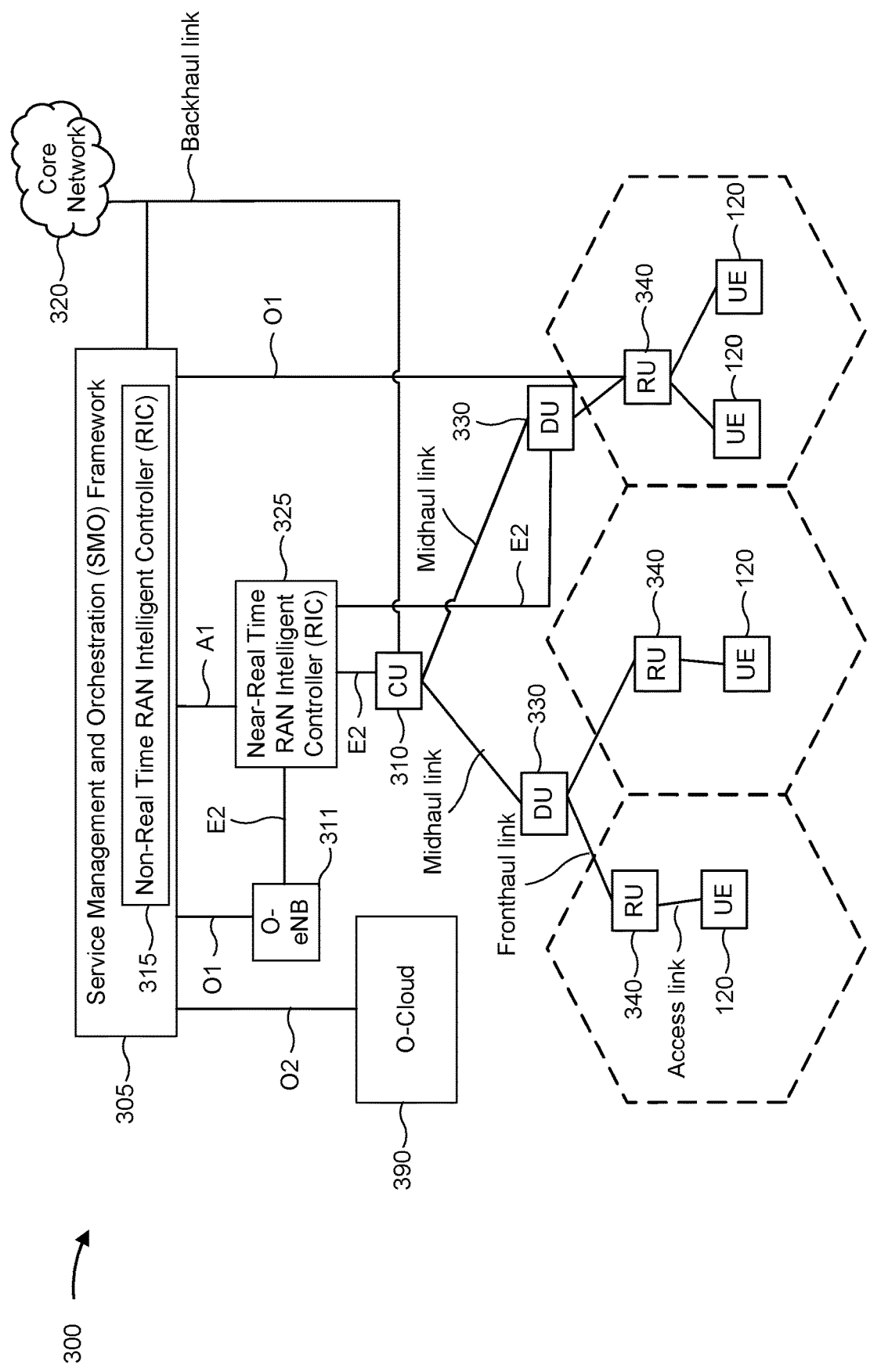
FIG. 3 is a diagram illustrating an example disaggregated network node architecture, in accordance with the present disclosure.

FIG. 3 is a diagram illustrating an example disaggregated network node architecture 300, in accordance with the present disclosure. The disaggregated network node architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more network node functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIGS. 1-3 are provided as examples. Other examples may differ from what is described with regard to FIGS. 1-3.

Figure 4:
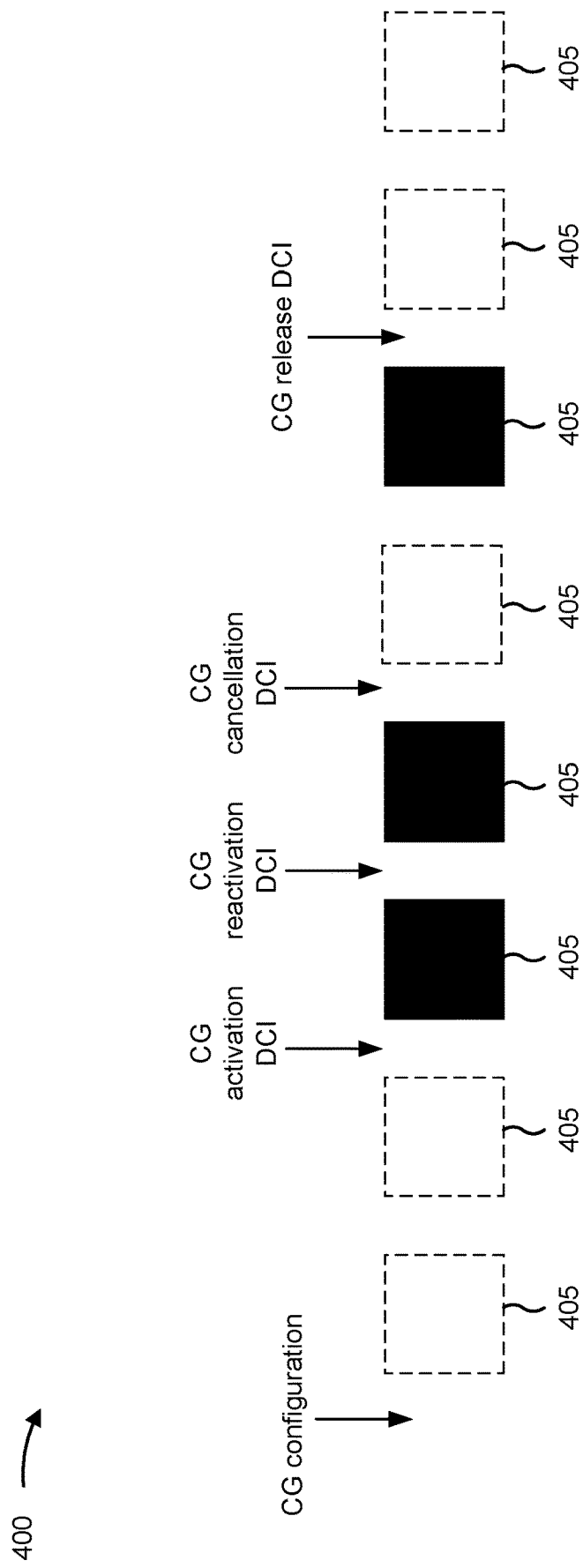
FIG. 4 is a diagram illustrating an example of uplink configured grant (CG) communication, in accordance with the present disclosure.

FIG. 4 is a diagram illustrating an example 400 of uplink configured grant (CG) communication, in accordance with the present disclosure. CG communications may include periodic uplink communications that are configured for a UE, such that the network node does not need to send separate downlink control information (DCI) to schedule each uplink communication, thereby conserving signaling overhead.

As shown in example 400, a UE may be configured with a CG configuration for CG communications. For example, the UE may receive the CG configuration via an RRC message transmitted by a network node. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 405 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

The network node may transmit CG activation DCI to the UE to activate the CG configuration for the UE. The network node may indicate, in the CG activation DCI, communication parameters, such as an MCS, a resource block (RB) allocation, and/or antenna ports, for the CG physical uplink shared channel (PUSCH) communications to be transmitted in the scheduled CG occasions 405. The UE may begin transmitting in the CG occasions 405 based at least in part on receiving the CG activation DCI. For example, beginning with a next scheduled CG occasion 405 subsequent to receiving the CG activation DCI, the UE may transmit a PUSCH communication in the scheduled CG occasions 405 using the communication parameters indicated in the CG activation DCI. The UE may refrain from transmitting in configured CG occasions 405 prior to receiving the CG activation DCI.

The network node may transmit CG reactivation DCI to the UE to change the communication parameters for the CG PUSCH communications. Based at least in part on receiving the CG reactivation DCI, and the UE may begin transmitting in the scheduled CG occasions 405 using the communication parameters indicated in the CG reactivation DCI. For example, beginning with a next scheduled CG occasion 405 subsequent to receiving the CG reactivation DCI, the UE may transmit PUSCH communications in the scheduled CG occasions 405 based at least in part on the communication parameters indicated in the CG reactivation DCI.

In some cases, such as when the network node needs to override a scheduled CG communication for a higher priority communication, the network node may transmit CG cancellation DCI to the UE to temporarily cancel or deactivate one or more subsequent CG occasions 405 for the UE. The CG cancellation DCI may deactivate only a subsequent one CG occasion 405 or a subsequent N CG occasions 405 (where N is an integer). CG occasions 405 after the one or more (e.g., N) CG occasions 405 subsequent to the CG cancellation DCI may remain activated. Based at least in part on receiving the CG cancellation DCI, the UE may refrain from transmitting in the one or more (e.g., N) CG occasions 405 subsequent to receiving the CG cancellation DCI. As shown in example 400, the CG cancellation DCI cancels one subsequent CG occasion 405 for the UE. After the CG occasion 405 (or N CG occasions) subsequent to receiving the CG cancellation DCI, the UE may automatically resume transmission in the scheduled CG occasions 405.

The network node may transmit CG release DCI to the UE to deactivate the CG configuration for the UE. The UE may stop transmitting in the scheduled CG occasions 405 based at least in part on receiving the CG release DCI. For example, the UE may refrain from transmitting in any scheduled CG occasions 405 until another CG activation DCI is received from the network node. Whereas the CG cancellation DCI may deactivate only a subsequent one CG occasion 405 or a subsequent N CG occasions 405, the CG release DCI deactivates all subsequent CG occasions 405 for a given CG configuration for the UE until the given CG configuration is activated again by a new CG activation DCI.

In some situations, a CG configuration may be used for transmission of a PUSCH. A PUSCH is an uplink channel. The PUSCH is used to transfer end-user application data, signaling radio bearer (SRB) messages, medium access control (MAC) control elements, and uplink control information (UCI) (which may be referred to as "piggybacked" UCI when transmitted on a PUSCH), as some examples. A PUSCH associated with a CG configuration (e.g., transmitted on resources configured by a CG configuration) may be referred to herein as a CG-PUSCH. "Transmitting a CG-PUSCH" may refer to transmitting a communication using the PUSCH on a resource allocation defined by a CG occasion 405. "Transmitting a channel" may refer to transmitting a communication using the channel. Techniques described herein provide indication of whether a CG-PUSCH will be transmitted, before a first configured symbol of the CG-PUSCH, as described in more detail in connection with FIG. 4.

As indicated above, FIG. 4 is provided as an example. Other examples may differ from what is described with respect to FIG. 4.

Figure 5:
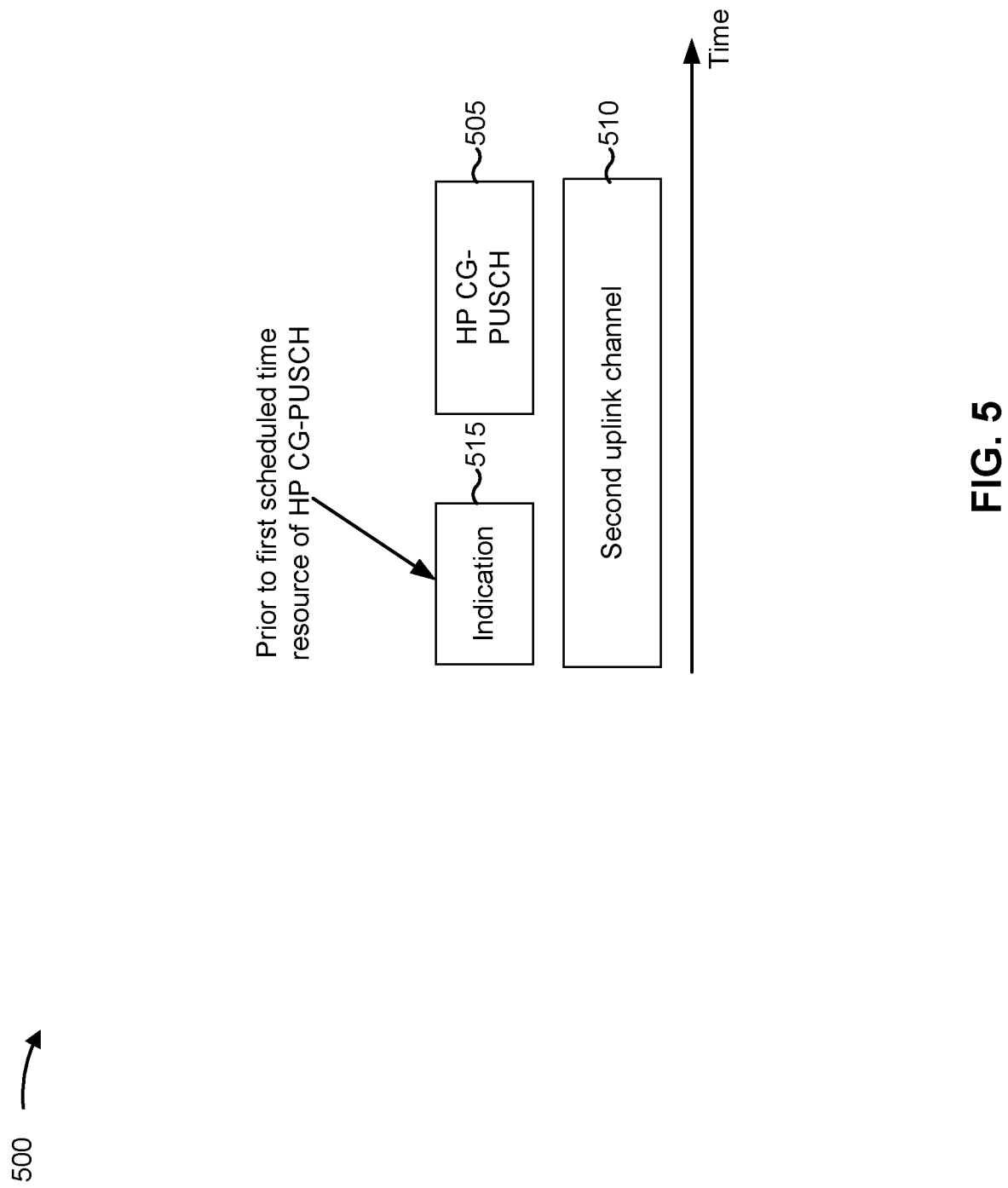
FIG. 5 is a diagram illustrating an example of indication of whether a configured grant physical uplink shared channel (CG-PUSCH) is to be transmitted, in accordance with the present disclosure.

FIG. 5 is a diagram illustrating an example 500 of indication of whether a CG-PUSCH is to be transmitted, in accordance with the present disclosure. Example 500 illustrates uplink transmissions by a UE 120, which may be received by a network node 110. Example 500 shows a CG-PUSCH 505 associated with a higher priority level (indicated by "HP", and higher than the lower priority level of the second uplink channel 510) and a second uplink channel 510 associated with a low priority level (indicated by "LP", and lower than the higher priority level of the CG-PUSCH 505). The CG-PUSCH 505 and the second uplink channel 510 at least partially overlap in time, meaning that one or more same time resources (e.g., symbol) are included in both a resource allocation of the CG-PUSCH 505 and a resource allocation of the second uplink channel 510. Example 500 relates to how a UE 120 can transmit an indication of whether or not a CG-PUSCH 505 will be transmitted prior to a first symbol of the CG-PUSCH 505. While in example 500, the indication indicates whether the CG-PUSCH 505 or the second uplink channel 510 is transmitted, some techniques described herein provide an indication of whether or not a CG-PUSCH will be transmitted (e.g., irrespective of whether the second uplink channel 510 is transmitted).

The priority levels assigned to the CG-PUSCH 505 and the second uplink channel 510 may be physical layer priorities. For example, the CG-PUSCH 505 may be associated with a first physical layer priority index and the second uplink channel 510 may be associated with a second physical layer priority index, where the first physical layer priority index is associated with a higher priority than the second physical layer priority index. The UE 120 may determine whether the transmission of the second uplink channel 510 should be canceled due to the overlap with the CG-PUSCH 505. For example, if the second uplink channel 510 is a lower priority CG-PUSCH or a lower priority PUCCH, the UE 120 may cancel transmission of the second uplink channel 510, at the latest, at a first symbol of the CG-PUSCH 505. As another example, if the second uplink channel 510 is a lower priority dynamic grant (DG) PUSCH, the UE 120 may cancel transmission of the second uplink channel 510 (which may be enabled by a higher-layer configuration parameter prioLowDG-HighCG). In some aspects, the second uplink channel 510 is a lower priority CG-PUSCH in the same serving cell as the CG-PUSCH 505. In some aspects, the second uplink channel 510 is a lower priority PUCCH in the same serving cell as the CG-PUSCH 505. In some aspects, the second uplink channel 510 cannot be transmitted simultaneously with the CG-PUSCH 505 (such as due to a beamforming capability at the UE 120 and/or a network node 110 that receives the CG-PUSCH 505 and/or the second uplink channel 510). In some aspects, the second uplink channel is a lower priority dynamic grant PUSCH (scheduled by downlink control information indicating the lower priority) in the same serving cell as the CG-PUSCH 505, and the UE 120 is configured with the higher-layer parameter prioLowDG-HighCG.

There are situations in which a UE 120 may not transmit a CG-PUSCH 505 even though the CG-PUSCH 505 is scheduled for transmission. For example, data may not be available at the UE 120 in association with the logical channel associated with the CG configuration of the CG-PUSCH 505. A network node 110 attempting to decode the CG-PUSCH 505 may not be aware of whether data is available at the UE 120 for transmission using the CG-PUSCH 505. Therefore, the network node 110 may have to perform a blind decoding attempt for the CG-PUSCH 505, which uses processing and reception resources of the network node 110.

In some examples, if the UE 120 does not transmit the CG-PUSCH 505, then the UE 120 may transmit the second uplink channel 510. In such examples, a network node 110 attempting to decode the CG-PUSCH 505 and the second uplink channel 510 may not be aware of whether data is available at the UE 120 for transmission using the CG-PUSCH 505. As a result, the network node 110 may need to perform multiple blind decoding attempts (such as at least one for the CG-PUSCH 505 and at least one for the second uplink channel 510) since the network node 110 may not know whether the CG-PUSCH 505 or the second uplink channel 510 will be transmitted. This increases complexity, processing resources used, and power consumption at the network node 110. Furthermore, decoding using multiple blind decoding attempts may not be possible for beamformed communications when the CG-PUSCH 505 and the second uplink channel 510 are associated with different beams and the network node 110 is only capable of receiving one beam.

Some techniques described herein provide an indication 515, prior to a first configured symbol (e.g., an earliest time resource) of the CG-PUSCH 505, of whether or not the CG-PUSCH 505 will be transmitted. The UE may then transmit a communication in accordance with (e.g., consistent with) the indication. The indication 515, received by the network node 110, may enable the network node 110 to receive the communication from the UE in accordance with (e.g., consistent with) the indication. Thus, the indication 515 may enable the network node 110 to receive the communication using a reduced amount of blind decoding relative to if no indication 515 was transmitted, which can conserve processing and reception resources of the network node 110. For example, the received indication may allow the network node 110 to determine whether or not the CG-PUSCH 505 will be transmitted and/or may identify which channel, of the CG-PUSCH 505 or a second uplink channel 510 is transmitted according to the indication 515. Thus, the number of blind decoding hypotheses at the network node 110 is reduced because the network node 110 has received information indicating the channel, which reduces complexity at the network node 110. Furthermore, the indication 515 may enable or improve the usage of overlapped CG-PUSCHs and other channels by some network nodes 110 in frequency ranges utilizing beamforming, since the network node 110 can identify which channel (and therefore which beam) will be transmitted, thereby eliminating the need to simultaneously monitor multiple beams.

In example 500, if the indication 515 indicates that the CG-PUSCH 505 will be transmitted, then the UE 120 may transmit a communication using the CG-PUSCH 505. In other words, the UE 120 transmits a communication (e.g., the CG-PUSCH 505) in accordance with the indication 515. In some aspects, the UE 120 may cancel the second uplink channel 510 (e.g., not transmit the second uplink channel) based on transmitting the CG-PUSCH 505. The network node 110 may receive the communication in accordance with the indication 515. For example, the network node 110 may decode the CG-PUSCH 505.

If the indication 515 indicates that the CG-PUSCH 505 will not be transmitted, then the UE 120 may cancel or not transmit the CG-PUSCH 505 and/or the UE 120 may transmit the second uplink channel 510. In other words, the UE 120 transmits a communication (e.g., the second uplink channel 510) in accordance with the indication 515. In this example, the network node 110 may decode the second uplink channel 510. Thus, the network node 110 may determine which of two overlapped uplink channels to receive according to the indication 515.

As indicated above, FIG. 5 is provided as an example. Other examples may differ from what is described with regard to FIG. 5.

Figure 6:
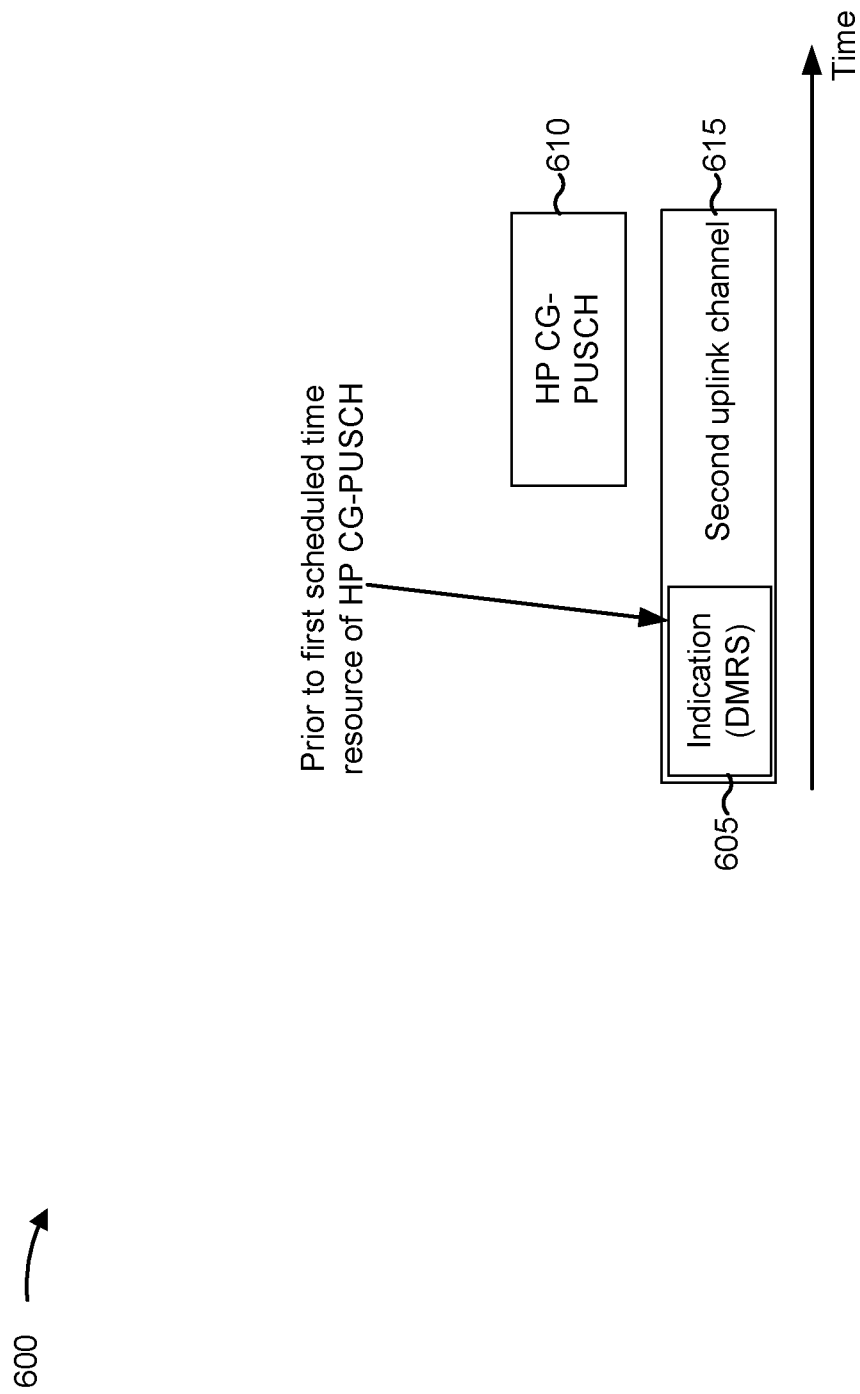
FIG. 6 is a diagram illustrating an example of an indication based at least in part on a scrambling sequence of a demodulation reference signal (DMRS), in accordance with the present disclosure.

FIG. 6 is a diagram illustrating an example 600 of an indication 605 based at least in part on a scrambling sequence of a DMRS, in accordance with the present disclosure. Example 600 illustrates uplink transmissions by a UE 120, which may be received by a network node 110.

A DMRS is a reference signal used for demodulation of a channel, such as a PUSCH, a PUCCH, or the like. For example, the DMRS may be transmitted within a communication on the channel. The DMRS and the channel may be transmitted using the same precoding and the same antenna ports, such that the DMRS and the channel experience the same composite propagation channel. A scrambling sequence used to generate the DMRS may enable a receiver of the channel to deduce the composite propagation channel, such that the channel can be decoded using the composite propagation channel. A scrambling sequence is a sequence of values used to generate a DMRS. For example, a scrambling sequence may be initialized using one or more configured parameters. The UE 120 may generate a DMRS according to the initialized scrambling sequence.

In example 600, an indication 605 indicates whether a CG-PUSCH 610 will be transmitted (as described in connection with the CG-PUSCH 505 and the indication 515 of FIG. 5). For example, and as illustrated, the indication 605 may be transmitted prior to a first configured time resource (e.g., symbol) of an occasion of the CG-PUSCH 610 to which the indication 605 relates. In example 600, the indication 605 is based at least in part on a scrambling sequence of a DMRS transmitted in a communication using a second uplink channel 615 (e.g., the second uplink channel 510 of FIG. 5). For example, a first scrambling sequence of the DMRS may indicate that the CG-PUSCH 610 is to be transmitted, and a second scrambling sequence of the DMRS may indicate that the second uplink channel 615 is to be transmitted (e.g., instead of the CG-PUSCH 610). In some aspects, the first scrambling sequence of the DMRS may indicate that the second uplink channel 615 is not to be transmitted. In some aspects, the second scrambling sequence may indicate that the CG-PUSCH 610 is not to be transmitted. In some aspects, the first scrambling sequence of the DMRS may be a normal (e.g., baseline) scrambling sequence, and the second scrambling sequence of the DMRS may be different than the normal scrambling sequence. In some aspects, the provision of the indication 605 comprising the DMRS may be conditioned on the second uplink channel 615 starting earlier than the CG-PUSCH 610 (such that the indication 605 can be provided prior to a first scheduled time resource of the CG-PUSCH 610). By providing the indication 605 as a DMRS with a particular scrambling sequence, decoding resource usage is reduced at the network node 110 relative to using two blind decoding hypotheses for the entire CG-PUSCH 610 and the entire second uplink channel 615, since two blind decoding hypotheses for two DMRS sequences use fewer decoding resources than two blind decoding hypotheses for entire channels. Furthermore, a single beam at a time can be used to transmit or receive the second uplink channel 615 and/or the CG-PUSCH 610.

As used herein, a first scrambling sequence is a scrambling sequence defined by a set of DMRS configuration parameters, such as scramblingID0 and scramblingID1 or a DMRS configuration parameter configured for a serving cell of the UE 120. A second scrambling sequence (e.g., other than a first scrambling sequence, referred to above as a baseline or normal scrambling sequence) may be defined by a set of parameters having different values than scramblingID0 and scramblingID1.

As noted, in some aspects, the indication 605 may indicate whether the second uplink channel 615 will be transmitted. For example, the indication 605 may indicate that an entirety of the second uplink channel 615 will be transmitted (e.g., that the CG-PUSCH 610 overlapping the second uplink channel 615 will not be transmitted), or that a part of the second uplink channel 615 that overlaps the CG-PUSCH 610 will not be transmitted (such that the CG-PUSCH 610 can be transmitted instead of the part of the second uplink channel 615). In other words, the indication 605 can be provided in a first part of the second uplink channel 615, irrespective of whether or not a second part of the second uplink channel 615, which overlaps the CG-PUSCH 610 in time, will be transmitted.

As indicated above, FIG. 6 is provided as an example. Other examples may differ from what is described with regard to FIG. 6.

Figure 7:
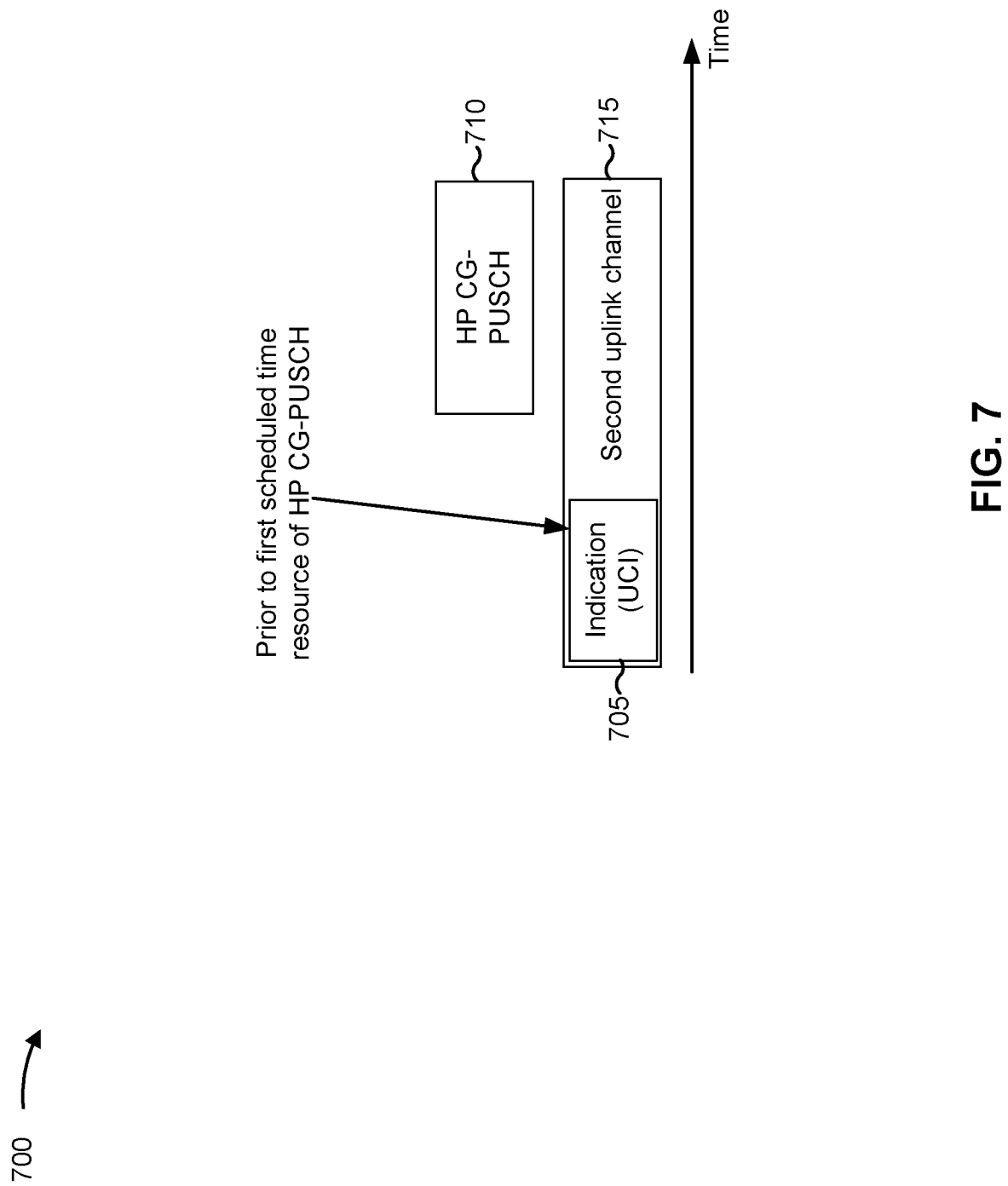
FIG. 7 is a diagram illustrating an example of an indication based at least in part on uplink control information (UCI), in accordance with the present disclosure.

FIG. 7 is a diagram illustrating an example 700 of an indication 705 based at least in part on UCI, in accordance with the present disclosure. Example 700 illustrates uplink transmissions by a UE 120, which may be received by a network node 110.

In example 700, an indication 705 indicates whether a CG-PUSCH 710 will be transmitted (as described in connection with the CG-PUSCH 505 and the indication 515 of FIG. 5). For example, and as illustrated, the indication 705 may be transmitted prior to a first scheduled time resource (e.g., symbol) of the CG-PUSCH 710. In example 700, the indication 705 comprises UCI provided on a second uplink channel 715 (e.g., the second uplink channel 510 of FIG. 5). For example, the UCI may be multiplexed with the second uplink channel 715. In some aspects, the UCI may be mapped to one or more resource elements (REs) of a PUSCH (if the second uplink channel 715 is a PUSCH). In some aspects, a first value of the UCI (e.g., a first bit value) may indicate that the CG-PUSCH 710 will be transmitted. For example, the first value of the UCI may indicate that at least part of the second uplink channel 715 will not be transmitted (e.g., will be cancelled). In some aspects, a second value of the UCI (e.g., a second bit value) may indicate that the second uplink channel 715 will be transmitted (e.g., that an entirety of the second uplink channel 715 will be transmitted). For example, the second value of the UCI may indicate that the CG-PUSCH 710 will not be transmitted.

In some aspects, the indication 705 may be appended to a hybrid automatic repeat request (HARQ) acknowledgment (HARQ-ACK), if a HARQ-ACK is present in the second uplink channel 715. For example, the indication 705 (e.g., the UCI) may be jointly encoded with HARQ feedback (e.g., a HARQ-ACK payload, HARQ-ACK UCI) on the second uplink channel 715. In some aspects, the indication 705 (e.g., the UCI) may not be multiplexed with HARQ-ACK UCI, if HARQ-ACK UCI is not present on the second uplink channel 715. For example, the indication 705 may be provided via standalone UCI on the second uplink channel 715.

In some aspects, the second uplink channel 715 is a PUSCH (such as associated with a CG or a dynamic grant). The PUSCH may be associated with the CG in that the PUSCH is transmitted on an occasion of the CG. In some aspects, the second uplink channel 715 is rate matched around the indication 705 (e.g., the UCI). For example, a data rate of the second uplink channel 715 may be adjusted according to an amount of resource elements occupied by the second uplink channel 715, such that data of a communication on the second uplink channel 715 is not lost due to the inclusion of the indication 705. In some aspects, the second uplink channel 715 is punctured by the indication 705 (e.g., the UCI). For example, a number of resource elements of a communication on the second uplink channel 715 may be dropped for inclusion of the indication 705, which may simplify encoding at the UE 120.

In some aspects, the provision of the indication 705 comprising the UCI may be conditioned on the second uplink channel 715 starting earlier than the CG-PUSCH 710 (such that the indication 705 can be provided prior to a first scheduled time resource of the CG-PUSCH 710). In some aspects, the second uplink channel 715 may start earlier than the CG-PUSCH 710, as illustrated in FIG. 7.

As indicated above, FIG. 7 is provided as an example. Other examples may differ from what is described with regard to FIG. 7.

Figure 8:
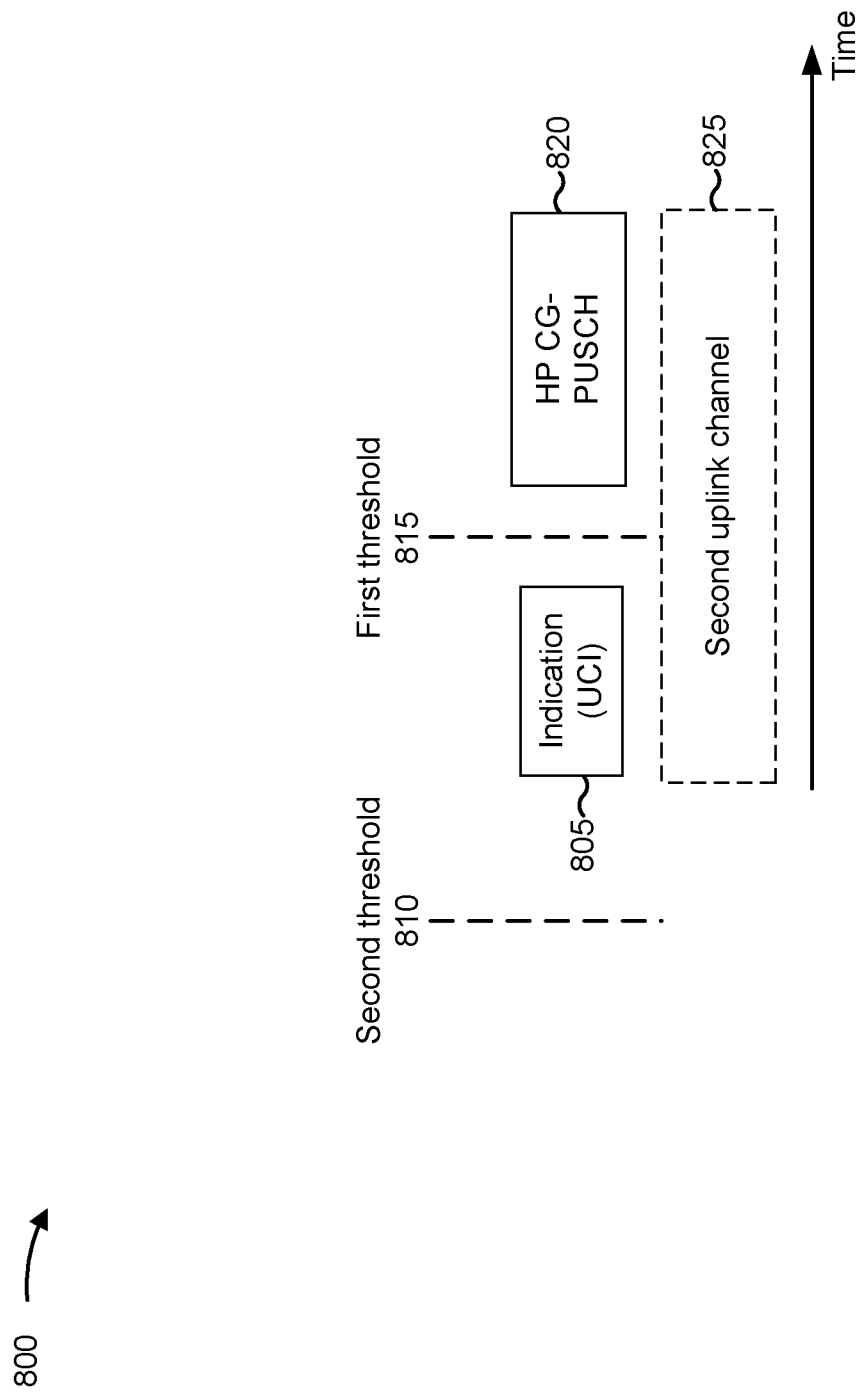
FIG. 8 is a diagram illustrating an example of transmitting an indication in accordance with one or more time thresholds, in accordance with the present disclosure.

FIG. 8 is a diagram illustrating an example 800 of transmitting an indication 805 in accordance with one or more time thresholds, in accordance with the present disclosure. Example 800 illustrates uplink transmissions by a UE 120, which may be received by a network node 110.

As shown, example 800 includes a first threshold 810 and a second threshold 815, which may be referred to as time thresholds. In some aspects, the first threshold 810 may indicate a latest time at which the indication 805 (e.g., the indication 515) can be (e.g., is permitted or configured to be) transmitted by the UE 120. In some aspects, the first threshold 810 may indicate a latest time at which the indication 805 can be received by the network node 110. In some aspects, the second threshold 815 may indicate an earliest time at which the indication 805 can be (e.g., is permitted or configured to be) transmitted by the UE 120. In some aspects, the second threshold 815 may indicate an earliest time at which the indication can be received by the network node 110.

In some aspects, the first threshold 810 may be defined in terms of symbols. For example, the first threshold 810 may indicate a minimum number of symbols. This minimum number of symbols may be compared to a number of symbols between a first symbol of the indication 805 and a first symbol of the CG-PUSCH 820 (e.g., the CG-PUSCH 505). If the number of symbols is lower than the minimum number of symbols, then the UE 120 may not transmit the indication 805, and/or the network node 110 may not process (e.g., may disregard) the indication 805. The first threshold 810 may ensure that the network node 110 has sufficient time between the indication 805 and the CG-PUSCH 820 to prepare for reception of the CG-PUSCH 820 or the second uplink channel 825 (e.g., the second uplink channel 510), if the second uplink channel 825 is scheduled.

In some aspects, the second threshold 815 may be defined in terms of symbols. For example, the second threshold 815 may indicate a maximum number of symbols. This maximum number of symbols may be compared to a number of symbols between a first symbol of the indication 805 and a first symbol of the CG-PUSCH 820 (e.g., the CG-PUSCH 505). If the number of symbols is lower than the maximum number of symbols, then the UE 120 may not transmit the indication 805, and/or the network node 110 may not process (e.g., may disregard) the indication 805. The second threshold 815 may improve flexibility at the UE 120, since a requirement to transmit an indication 805 much earlier than a CG-PUSCH 820 may constrain the UE 120's usage (or determination not to use) the CG-PUSCH 820.

The first threshold 810 and/or the second threshold 815 may be implemented in connection with example 500 of FIG. 5, example 600 of FIG. 6, and/or example 700 of FIG. 7. For example, the indication 515, the indication 605, and/or the indication 705 may be provided in accordance with one or more of the first threshold 810 or the second threshold 815.

As indicated above, FIG. 8 is provided as an example. Other examples may differ from what is described with regard to FIG. 8.

Figure 9:
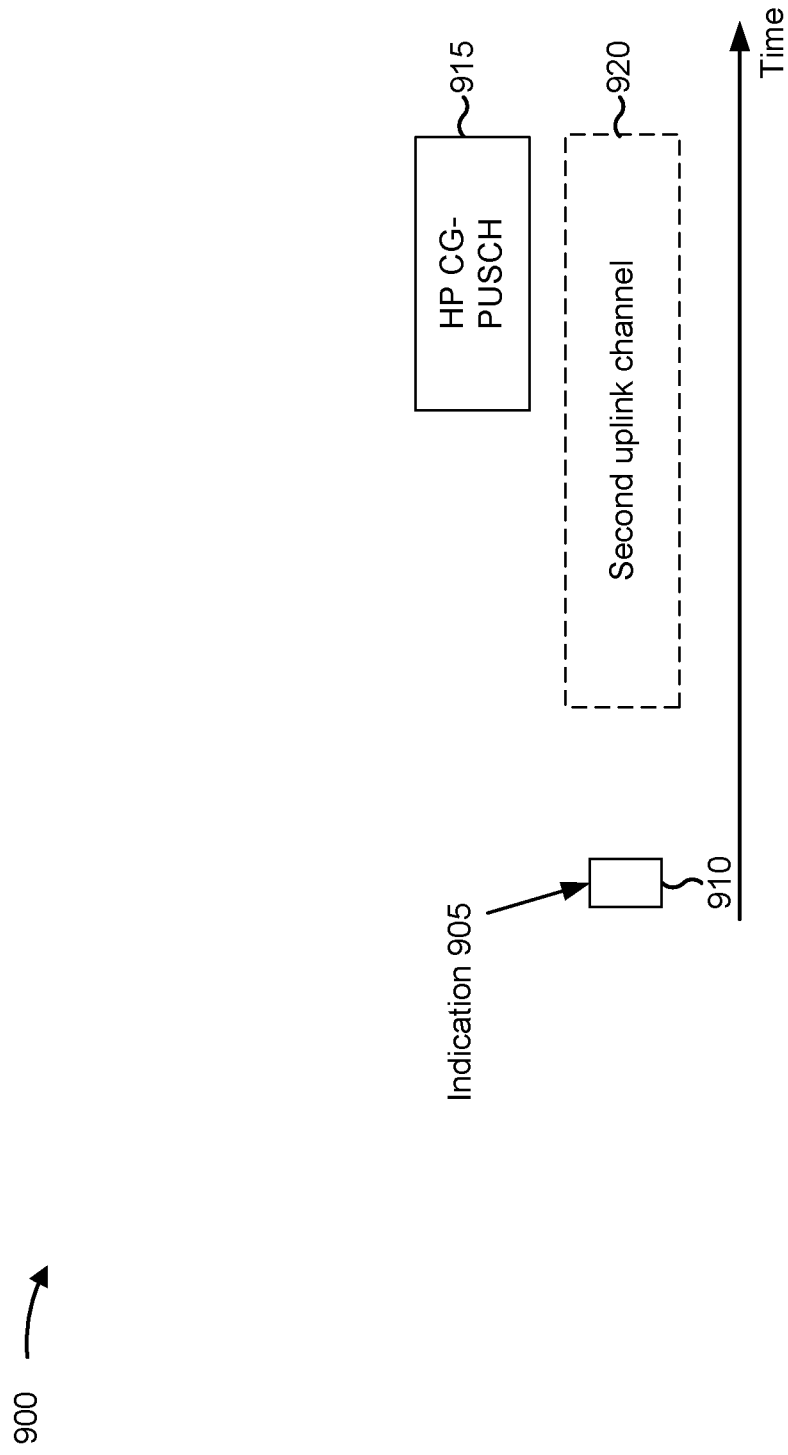
FIG. 9 is a diagram illustrating an example of transmitting an indication via a configured physical uplink control channel (PUCCH) resource, in accordance with the present disclosure.

FIG. 9 is a diagram illustrating an example 900 of transmitting an indication 905 via a configured PUCCH resource 910, in accordance with the present disclosure. Example 900 illustrates uplink transmissions by a UE 120, which may be received by a network node 110. In example 900, the UE 120 may transmit the indication 905 via UCI on a configured PUCCH resource 910. In some aspects, the indication 905 may include a scheduling request. In some aspects, the indication 905 may include UCI encoded in the same fashion as a scheduling request. In some aspects, the indication 905 may include a buffer status report. In some aspects, the indication 905 may include a bit indicating whether or not the CG-PUSCH 915 (e.g., CG-PUSCH 505) is transmitted. For example, the bit may indicate whether a next CG-PUSCH 915 is to be transmitted.

The indication 905, transmitted in the configured PUCCH resource 910, can be implemented independently of a second uplink channel 920 (e.g., second uplink channel 510, second uplink channel 615, second uplink channel 715). For example, in some aspects, example 900 may not include a second uplink channel 920. In some aspects, the second uplink channel 920 may start at a same time as, or later than, the CG-PUSCH 915. Thus, providing the indication 905 in the configured PUCCH resource 910 enables indication of whether a CG-PUSCH 915 is to be transmitted irrespective of when or whether a second uplink channel 920 is scheduled, and may enable the UE 120 to entirely drop the second uplink channel 920 if the UE 120 determines not to transmit the second uplink channel 920, which conserves transmission resources of the UE 120. In some aspects, the indication 905 may indicate that the CG-PUSCH 915 is to be transmitted. In some aspects, the indication 905 may indicate that the second uplink channel 920 (e.g., at least part of the second uplink channel 920) is not to be transmitted. In some aspects, the indication 905 may indicate that the CG-PUSCH 915 is not to be transmitted. In some aspects, the indication 905 may indicate that an entirety of the second uplink channel 920 is to be transmitted.

In some aspects, the configured PUCCH resource 910 is configured with a first periodicity, and the CG-PUSCH 915 is configured with a second periodicity. In some aspects, the first periodicity is based at least in part on the second periodicity. For example, the first periodicity may be equal to the second periodicity, which may enable an indication 905 to be provided for each occasion of the CG-PUSCH 915. As another example, the second periodicity may be an integer multiple of the first periodicity, such that a proper subset of occasions of CG-PUSCHs 915 are associated with configured PUCCH resources 910 on which an indication 905 can be transmitted.

In some aspects, the configured PUCCH resource 910 may at least partially overlap the second uplink channel 920. In such examples, the indication 905 may be transmitted (e.g., multiplexed) on the second uplink channel 920, which may conserve transmission resources associated with transmitting a PUCCH on the configured PUCCH resource 910. In some aspects, the configured PUCCH resource 910 does not overlap the second uplink channel 920. In such examples, the UE 120 may transmit the indication 905 on the configured PUCCH resource 910. For example, UCI multiplexing may be performed after resolving an overlap between the CG-PUSCH 915 and the second uplink channel 920 (and hence, determining whether the second uplink channel 920 is dropped).

In some aspects, the indication 905 may be associated with at least one of a first threshold 810 or a second threshold 815. For example, the indication 905 may be provided in accordance with at least one of the first threshold 810 or the second threshold 815, as described in connection with FIG. 8. In this example, the first threshold 810 and/or the second threshold 815 may be applied according a number of symbols between a last scheduled symbol of the configured PUCCH resource 910 and the first configured symbol of the CG-PUSCH 915. In some aspects, the network node 110 may configure the configured PUCCH resource 910 according to one or more of the first threshold 810 or the second threshold 815. For example, the network node 110 may configure the configured PUCCH resource 910 such that the first threshold 810 and/or the second threshold 815 are satisfied for an indication 905 transmitted on the configured PUCCH resource 910.

In some aspects, an indication 905 may pertain to (e.g., be associated with) multiple CG-PUSCHs 915. For example, the indication 905 may indicate whether or not multiple CG-PUSCHs (such as CG-PUSCHs associated with different CG configurations and/or different occasions of a CG configuration) are to be transmitted. In this example, the indication 905 or the configured PUCCH resource 910 may be associated with multiple bit positions. Each bit position, of the multiple bit positions, may pertain to a different CG configuration and/or a different occasion of a CG configuration. For example, a first bit may indicate whether one or more CG-PUSCHs of a given CG configuration are to be transmitted. As another example, a first bit may indicate whether a CG-PUSCH on a first occasion of a CG configuration is to be transmitted, and a second bit may indicate whether a CG-PUSCH on a second occasion of the CG configuration is to be transmitted. Different CG configurations associated with an indication 905 (e.g., different CG configurations for which the indication 905 indicates whether or not a CG-PUSCH is transmitted) may be associated with the same periodicity or may be associated with different periodicities.

As indicated above, FIG. 9 is provided as an example. Other examples may differ from what is described with regard to FIG. 9.

Figure 10:
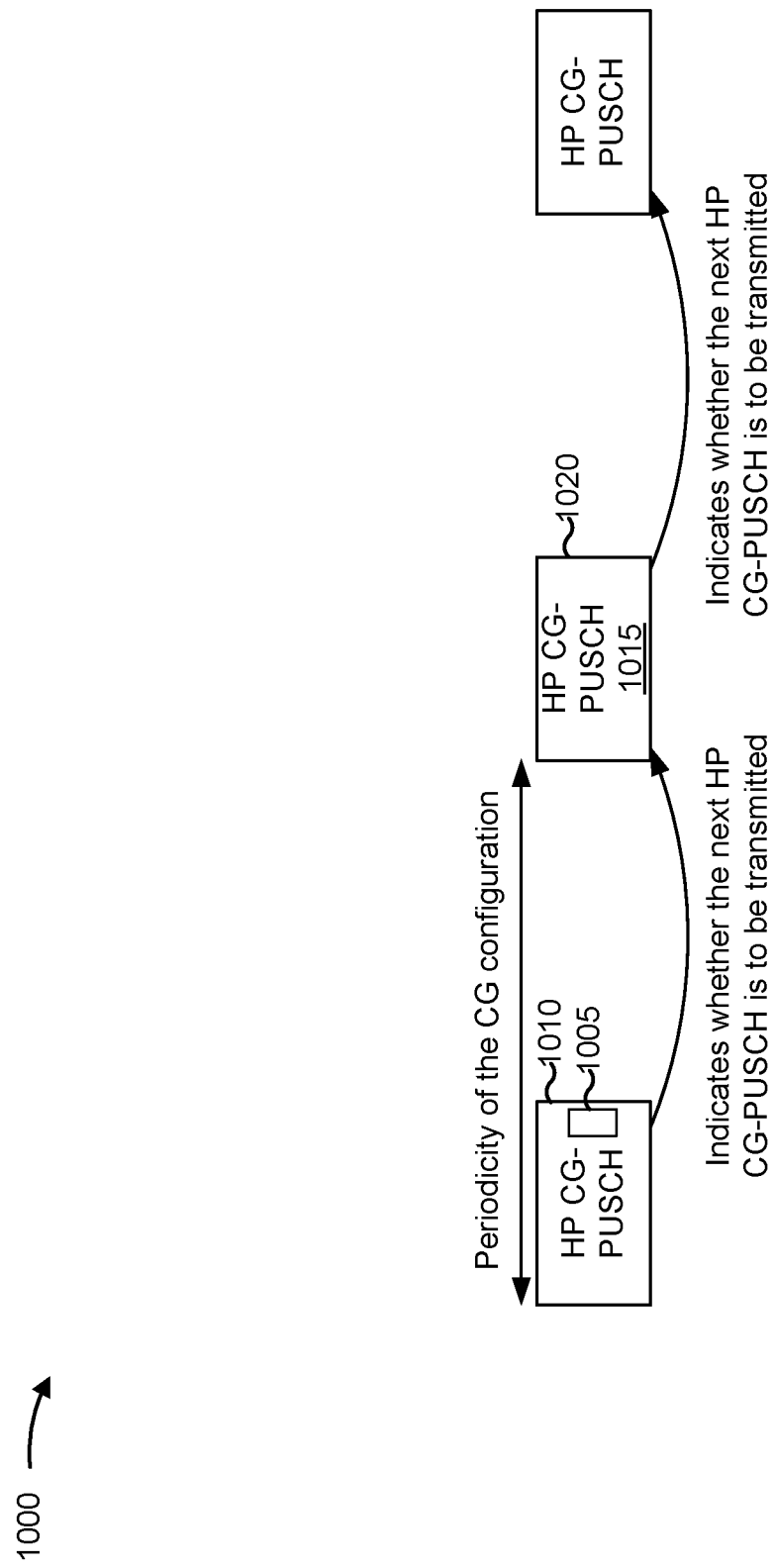
FIG. 10 is a diagram illustrating an example of an indication transmitted in an occasion, in accordance with the present disclosure.

FIG. 10 is a diagram illustrating an example 1000 of an indication 1005 (e.g., indication 515) transmitted in an occasion 1010, in accordance with the present disclosure. Example 1000 illustrates uplink transmissions by a UE 120, which may be received by a network node 110. The occasion 1010 may be a CG occasion of a CG configuration. The indication 1005 transmitted in the occasion 1010 may pertain to a CG-PUSCH 1015 in an occasion 1020. Thus, a first occasion of a CG-PUSCH (e.g., a CG configuration) can be used to indicate whether the CG-PUSCH will be transmitted in a second, subsequent occasion of the CG-PUSCH. In some aspects, the indication 1005 may be appended to an uplink communication (e.g., a CG-PUSCH) transmitted in the occasion 1010. For example, the indication 1005 may include a one-bit physical layer buffer status report pertaining to the CG-PUSCH transmitted in the occasion 1010. In this regard, the indication 1005 may resemble a keep alive signal. Thus, the UE 120 may provide an indication 1005 without a periodic PUCCH resource (e.g., periodic PUCCH resource 910) and without providing the indication 1005 via a second uplink channel (other than the CG-PUSCH, such as second uplink channel 510). In some aspects, the indication 1005 may pertain to multiple CG occasions. For example, the indication 1005 may include a first bit indicating whether a CG-PUSCH of a first occasion of the CG configuration will be transmitted, and a second bit indicating whether a CG-PUSCH of a second occasion of the CG configuration will be transmitted. The CG-PUSCH of the second occasion can include or be associated with an indication of whether a CG-PUSCH in one or more subsequent occasions, after the second occasion, will be transmitted, as shown. By providing an indication 1005 pertaining to multiple occasions, overhead is reduced relative to providing a separate indication for each occasion of the multiple occasions, which may be particularly beneficial, for example, for a case where a packet is split across multiple transport blocks transmitted on multiple occasions.

In some aspects, the indication 1005 may be associated with one or more of the first threshold 810 or the second threshold 815.

As indicated above, FIG. 10 is provided as an example. Other examples may differ from what is described with regard to FIG. 10.

Figure 11:
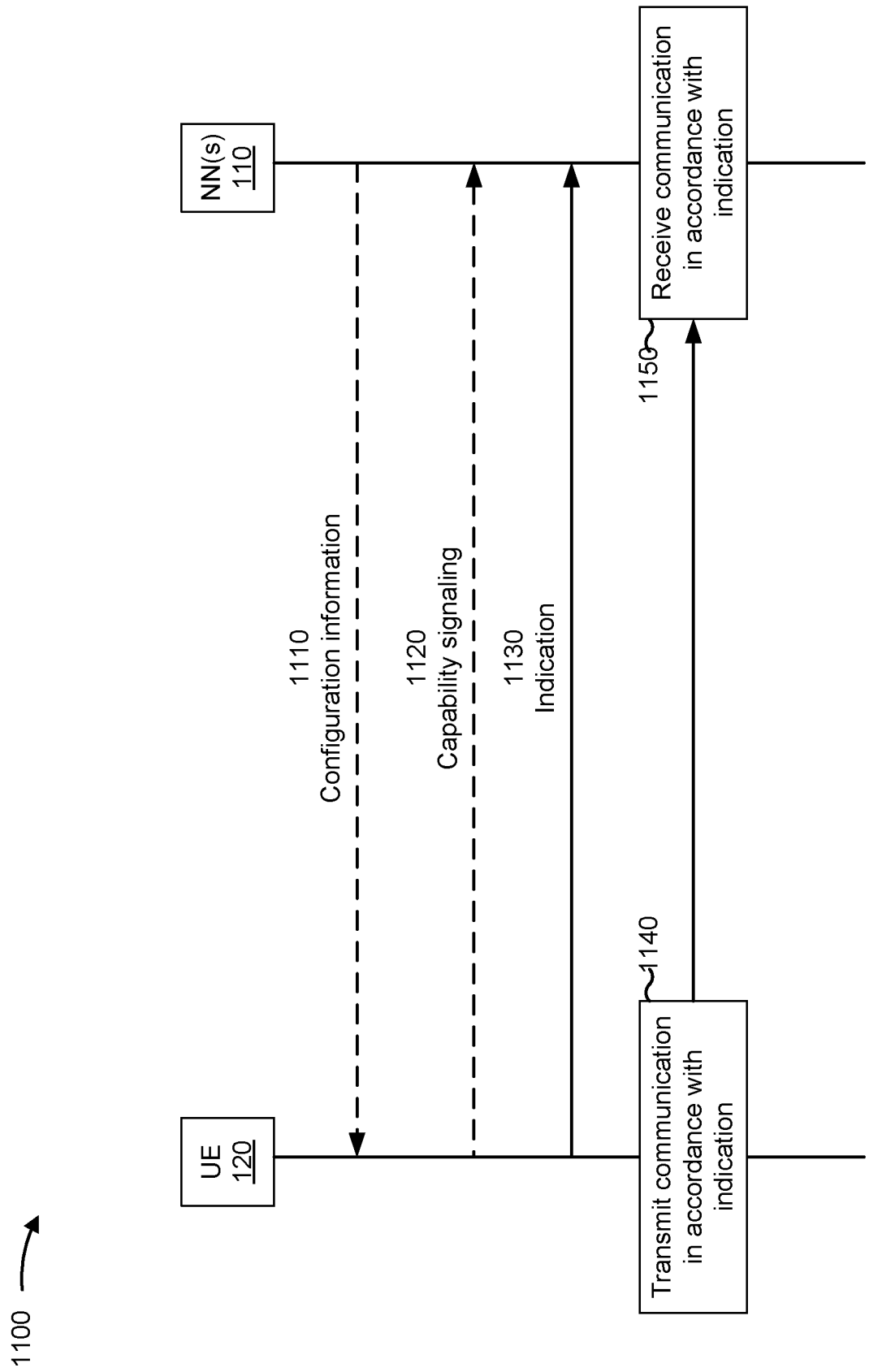
FIG. 11 is a diagram illustrating an example signaling associated with providing an indication of whether a CG-PUSCH will be transmitted, in accordance with the present disclosure.

FIG. 11 is a diagram illustrating an example 1100 of signaling associated with providing an indication of whether a CG-PUSCH will be transmitted, in accordance with the present disclosure. As shown, example 1100 includes a UE 120 and one or more network nodes 110. In some aspects, the one or more network nodes 110 include a single network node that performs the operations of example 1100. In some other aspects, a first network node 110 may perform one or more operations of example 1100, and a second network node 110 may perform one or more other operations of example 1100. For example, a first network node 110 (e.g., a CU or a DU, in some examples) may transmit configuration information and/or receive capability information, and a second network node 110 (e.g., a DU or an RU, in some examples) may perform physical layer communication (such as the reception of CG-PUSCHs and corresponding indications). The one or more network nodes 110 of example 1100 are hereinafter referred to as a network node 110 for brevity.

As shown in FIG. 11, and by reference number 1110, in some aspects, the network node 110 may transmit configuration information to the UE 120. For example, the network node 110 may transmit the configuration information via RRC signaling, MAC information, downlink control information, or a combination thereof. In some aspects, the configuration information may configure one or more CG configurations for the UE 120, such as a CG configuration associated with a CG-PUSCH (e.g., a CG-PUSCH described with regard to FIGS. 5-10), or a CG configuration associated with a configured PUCCH resource (such as the configured PUCCH resource 910 of FIG. 9). In some aspects, the configuration information may indicate a number of slots for a first threshold (e.g., first threshold 810). In some aspects, the configuration information may indicate a number of slots for a second threshold (e.g., second threshold 815). In some aspects, the configuration information may indicate for the UE 120 to implement one or more of the examples described herein. For example, the configuration information may indicate whether the UE 120 is to provide an indication according to example 500, example 600, example 700, example 800, example 900, and/or example 1000.

As shown by reference number 1120, in some aspects, the UE 120 may transmit capability signaling. In some aspects, the capability signaling may indicate a capability associated with one or more time thresholds. For example, the capability signaling may (directly or indirectly) indicate a number of slots or symbols for a first threshold (e.g., the first threshold 810). As another example, the capability signaling may (directly or indirectly) indicate a number of slots or symbols for a second threshold (e.g., the second threshold 815). In some aspects, the UE 120 may transmit the capability signaling prior to receiving the configuration information. In some aspects, the configuration information (e.g., the number of slots or symbols of the first threshold, the number of slots or symbols of the second threshold, a CG configuration associated with a configured PUCCH resource 910, or a CG configuration associated with a CG-PUSCH) may be based at least in part on the capability signaling.

As shown by reference number 1130, the UE 120 may transmit an indication. The indication may include one or more of the indications described with regard to FIGS. 5-10. The network node 110 may receive the indication. The indication may indicate whether a CG-PUSCH is to be transmitted, as described with regard to FIGS. 5-10. The indication may be received prior to a first configured symbol of the CG-PUSCH (e.g., the CG-PUSCH to which the indication pertains).

As shown by reference number 1140, the UE 120 may transmit a communication in accordance with the indication. For example, the UE 120 may transmit a CG-PUSCH if the indication indicates that the CG-PUSCH will be transmitted. As another example, the UE 120 may not transmit at least part of a second uplink channel if the indication indicates that the CG-PUSCH will be transmitted. As yet another example, the UE 120 may not transmit the CG-PUSCH if the indication indicates that the CG-PUSCH will not be transmitted. As another example, the UE 120 may transmit a second uplink channel if the indication indicates that the CG-PUSCH will not be transmitted. As shown by reference number 1150, the network node 110 may receive the communication in accordance with the indication. For example, the network node 110 may attempt to decode and/or may decode a CG-PUSCH if the indication indicates that the CG-PUSCH will be transmitted. As another example, the network node 110 may not attempt to decode and/or may not decode at least part of a second uplink channel if the indication indicates that the CG-PUSCH will be transmitted. As yet another example, the network node 110 may not attempt to decode and/or may not decode the CG-PUSCH if the indication indicates that the CG-PUSCH will not be transmitted. As another example, the network node 110 may attempt to decode and/or may decode a second uplink channel if the indication indicates that the CG-PUSCH will not be transmitted.

As indicated above, FIG. 11 is provided as an example. Other examples may differ from what is described with regard to FIG. 11.

Figure 12:
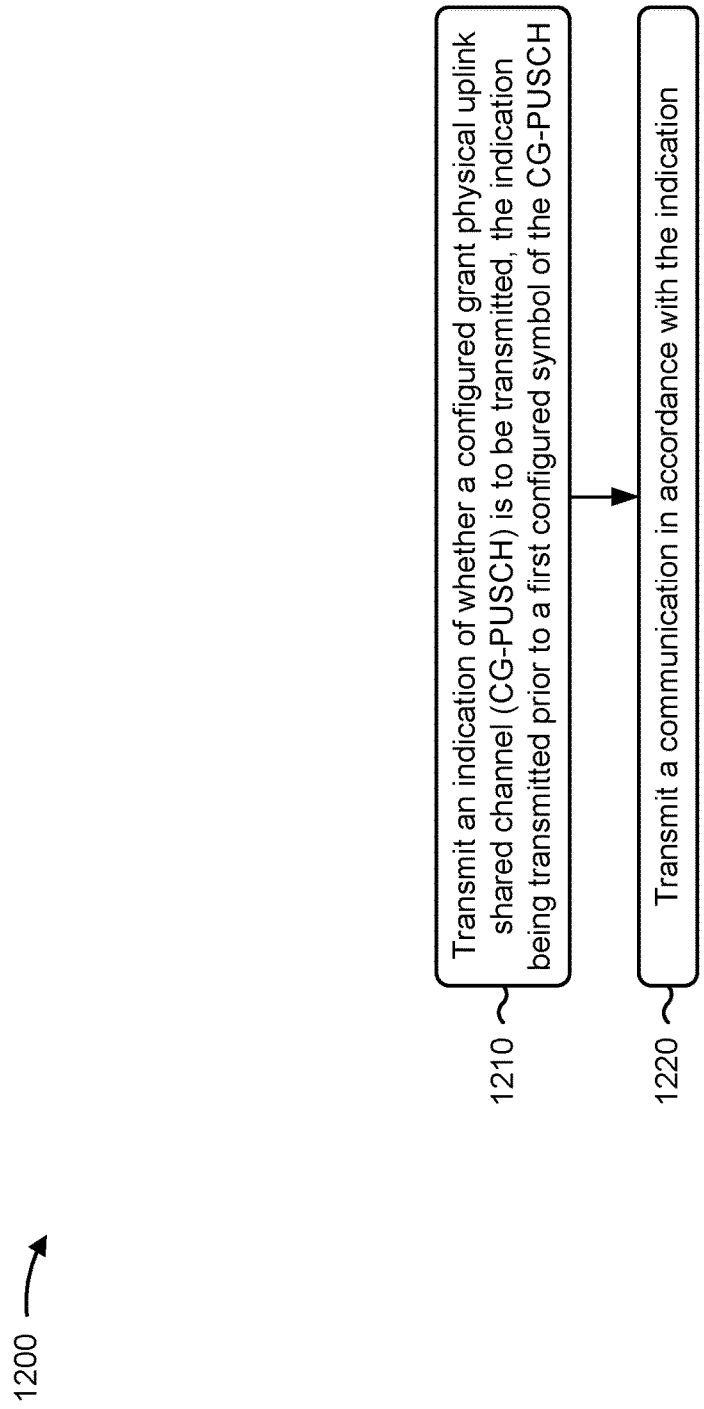
FIG. 12 is a diagram illustrating an example process performed, for example, by a UE, in accordance with the present disclosure.

FIG. 12 is a diagram illustrating an example process 1200 performed, for example, by a UE, in accordance with the present disclosure. Example process 1200 is an example where the UE (e.g., UE 120) performs operations associated with indication of whether a configured grant physical uplink shared channel is to be transmitted.

As shown in FIG. 12, in some aspects, process 1200 may include transmitting an indication of whether a CG-PUSCH is to be transmitted, the indication being transmitted prior to a first configured symbol of the CG-PUSCH (block 1210). For example, the UE (e.g., using communication manager 140 and/or indication component 1408, depicted in FIG. 14) may transmit an indication of whether a CG-PUSCH is to be transmitted, the indication being transmitted prior to a first configured symbol of the CG-PUSCH, as described above.

As further shown in FIG. 12, in some aspects, process 1200 may include transmitting a communication in accordance with the indication (block 1220). For example, the UE (e.g., using communication manager 140 and/or transmission component 1404, depicted in FIG. 14) may transmit a communication in accordance with the indication, as described above.

Process 1200 may include additional aspects, such as any single aspect or any combination of aspects described below and/or in connection with one or more other processes described elsewhere herein.

In a first aspect, the indication indicates that the CG-PUSCH is to be transmitted, and wherein transmitting the communication further comprises transmitting the communication using the CG-PUSCH.

In a second aspect, alone or in combination with the first aspect, the indication indicates that the CG-PUSCH is not to be transmitted, and wherein transmitting the communication further comprises transmitting the communication using a second uplink channel that overlaps the CG-PUSCH.

In a third aspect, alone or in combination with one or more of the first and second aspects, the indication is based at least in part on a scrambling sequence of a demodulation reference signal of a communication using a second uplink channel.

In a fourth aspect, alone or in combination with one or more of the first through third aspects, a first scrambling sequence indicates that the CG-PUSCH is to be transmitted and a second scrambling sequence indicates that the second uplink channel is to be transmitted.

In a fifth aspect, alone or in combination with one or more of the first through fourth aspects, the indication comprises UCI that is provided on a second uplink channel.

In a sixth aspect, alone or in combination with one or more of the first through fifth aspects, the UCI is jointly encoded with hybrid automatic repeat request feedback on the second uplink channel.

In a seventh aspect, alone or in combination with one or more of the first through sixth aspects, the second uplink channel is rate matched around the uplink control information.

In an eighth aspect, alone or in combination with one or more of the first through seventh aspects, the uplink control information punctures the second uplink channel.

In a ninth aspect, alone or in combination with one or more of the first through eighth aspects, transmitting the indication further comprises transmitting the indication in accordance with one or more time thresholds.

In a tenth aspect, alone or in combination with one or more of the first through ninth aspects, the one or more time thresholds include at least one of a first threshold indicating a latest time at which the indication can be transmitted, or a second threshold indicating an earliest time at which the indication can be transmitted.

In an eleventh aspect, alone or in combination with one or more of the first through tenth aspects, process 1200 includes receiving configuration information indicating the one or more time thresholds.

In a twelfth aspect, alone or in combination with one or more of the first through eleventh aspects, process 1200 includes transmitting capability signaling indicating a capability associated with the one or more time thresholds.

In a thirteenth aspect, alone or in combination with one or more of the first through twelfth aspects, transmitting the indication further comprises transmitting the indication via uplink control information on a configured uplink control channel resource.

In a fourteenth aspect, alone or in combination with one or more of the first through thirteenth aspects, the configured uplink control channel resource is associated with a first periodicity, and the CG-PUSCH is associated with a second periodicity equal to the first periodicity.

In a fifteenth aspect, alone or in combination with one or more of the first through fourteenth aspects, the configured uplink control channel resource includes multiple bit positions associated with indications for multiple CG-PUSCHs including the CG-PUSCH.

In a sixteenth aspect, alone or in combination with one or more of the first through fifteenth aspects, transmitting the indication further comprises transmitting the indication in an occasion of the CG-PUSCH.

In a seventeenth aspect, alone or in combination with one or more of the first through sixteenth aspects, the occasion is a first occasion of the CG-PUSCH, wherein a second occasion of the CG-PUSCH overlaps with a second uplink channel, and wherein the indication indicates whether the CG-PUSCH is to be transmitted in the second occasion.

In an eighteenth aspect, alone or in combination with one or more of the first through seventeenth aspects, the indication comprises a bit appended to an uplink communication transmitted in the occasion.

In a nineteenth aspect, alone or in combination with one or more of the first through eighteenth aspects, the indication pertains to at least two occasions of the CG-PUSCH.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
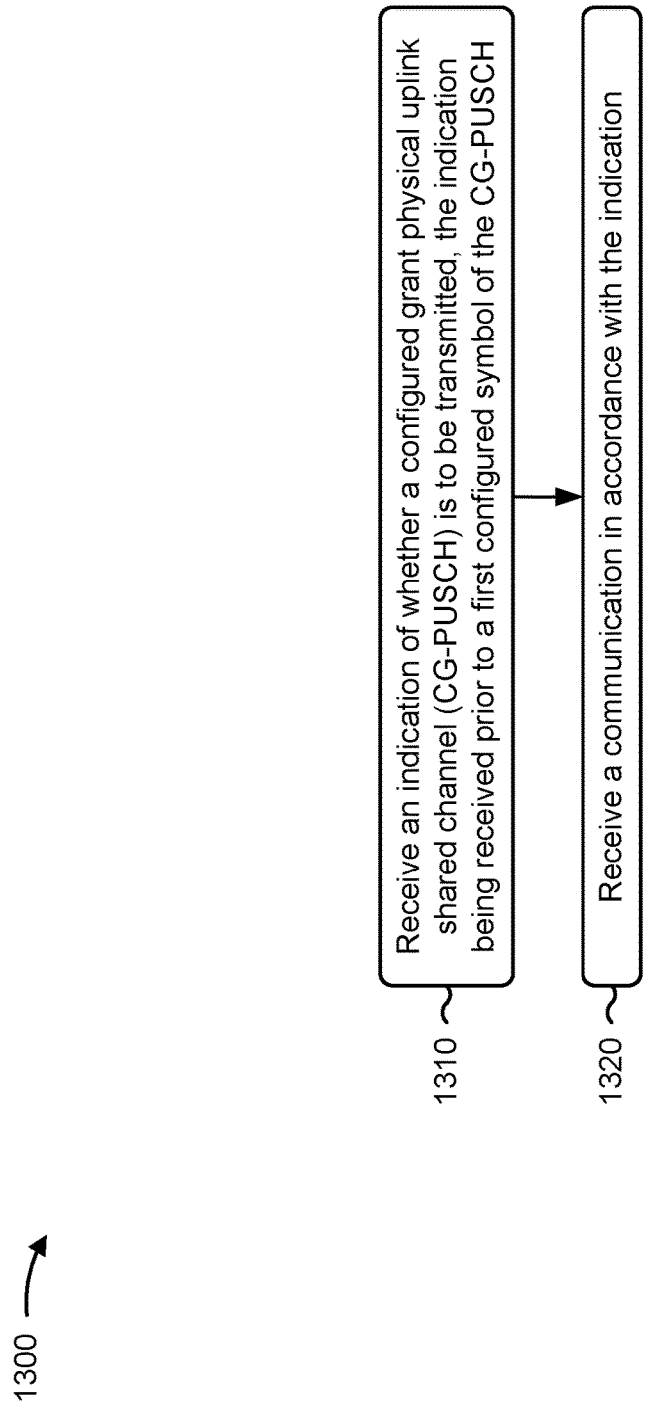
FIG. 13 is a diagram illustrating an example process performed, for example, by a network node, in accordance with the present disclosure.

FIG. 13 is a diagram illustrating an example process 1300 performed, for example, by a network node, in accordance with the present disclosure. Example process 1300 is an example where the network node (e.g., network node 110) performs operations associated with indication of whether a configured grant physical uplink shared channel is to be transmitted.

As shown in FIG. 13, in some aspects, process 1300 may include receiving an indication of whether a CG-PUSCH is to be transmitted, the indication being received prior to a first configured symbol of the CG-PUSCH (block 1310). For example, the network node (e.g., using communication manager 150 and/or reception component 1502, depicted in FIG. 15) may receive an indication of whether a CG-PUSCH is to be transmitted, the indication being received prior to a first configured symbol of the CG-PUSCH, as described above.

As further shown in FIG. 13, in some aspects, process 1300 may include receiving a communication in accordance with the indication (block 1320). For example, the network node (e.g., using communication manager 150 and/or reception component 1502, depicted in FIG. 15) may receive a communication in accordance with the indication, as described above.

Process 1300 may include additional aspects, such as any single aspect or any combination of aspects described below and/or in connection with one or more other processes described elsewhere herein.

In a first aspect, the indication indicates that the CG-PUSCH is to be transmitted, and wherein receiving the communication further comprises receiving the communication via the CG-PUSCH.

In a second aspect, alone or in combination with the first aspect, the indication indicates that the CG-PUSCH is not to be transmitted, and wherein receiving the communication further comprises receiving the communication using a second uplink channel that overlaps the CG-PUSCH.

In a third aspect, alone or in combination with one or more of the first and second aspects, the indication is based at least in part on a scrambling sequence of a demodulation reference signal of a communication using a second uplink channel.

In a fourth aspect, alone or in combination with one or more of the first through third aspects, a first scrambling sequence indicates that the CG-PUSCH is to be transmitted and a second scrambling sequence indicates that the second uplink channel is to be transmitted.

In a fifth aspect, alone or in combination with one or more of the first through fourth aspects, the indication comprises UCI that is provided on a second uplink channel.

In a sixth aspect, alone or in combination with one or more of the first through fifth aspects, the UCI is jointly encoded with hybrid automatic repeat request feedback on the second uplink channel.

In a seventh aspect, alone or in combination with one or more of the first through sixth aspects, the second uplink channel is rate matched around the uplink control information.

In an eighth aspect, alone or in combination with one or more of the first through seventh aspects, the uplink control information punctures the second uplink channel.

In a ninth aspect, alone or in combination with one or more of the first through eighth aspects, the second uplink channel starts earlier than a first symbol of the CG-PUSCH.

In a tenth aspect, alone or in combination with one or more of the first through ninth aspects, receiving the indication further comprises receiving the indication in accordance with one or more time thresholds.

In an eleventh aspect, alone or in combination with one or more of the first through tenth aspects, the one or more time thresholds include at least one of a first threshold indicating a latest time at which the indication can be transmitted, or a second threshold indicating an earliest time at which the indication can be transmitted.

In a twelfth aspect, alone or in combination with one or more of the first through eleventh aspects, process 1300 includes transmitting configuration information indicating the one or more time thresholds.

In a thirteenth aspect, alone or in combination with one or more of the first through twelfth aspects, process 1300 includes receiving capability signaling indicating a capability associated with the one or more time thresholds.

In a fourteenth aspect, alone or in combination with one or more of the first through thirteenth aspects, receiving the indication further comprises receiving the indication via uplink control information on a configured uplink control channel resource.

In a fifteenth aspect, alone or in combination with one or more of the first through fourteenth aspects, the configured uplink control channel resource is associated with a first periodicity, and the CG-PUSCH is associated with a second periodicity equal to the first periodicity.

In a sixteenth aspect, alone or in combination with one or more of the first through fifteenth aspects, the configured uplink control channel resource includes multiple bit positions associated with indications for multiple CG-PUSCHs including the CG-PUSCH.

In a seventeenth aspect, alone or in combination with one or more of the first through sixteenth aspects, receiving the indication further comprises receiving the indication in an occasion of the CG-PUSCH.

In an eighteenth aspect, alone or in combination with one or more of the first through seventeenth aspects, the occasion is a first occasion of the CG-PUSCH, wherein a second occasion of the CG-PUSCH overlaps with a second uplink channel, and wherein the indication indicates whether the CG-PUSCH is to be transmitted in the second occasion.

In a nineteenth aspect, alone or in combination with one or more of the first through eighteenth aspects, the indication comprises a bit appended to an uplink communication in the occasion.

In a twentieth aspect, alone or in combination with one or more of the first through nineteenth aspects, the indication indicates whether a plurality of uplink channels pertaining to at least two occasions of the CG-PUSCH are transmitted.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
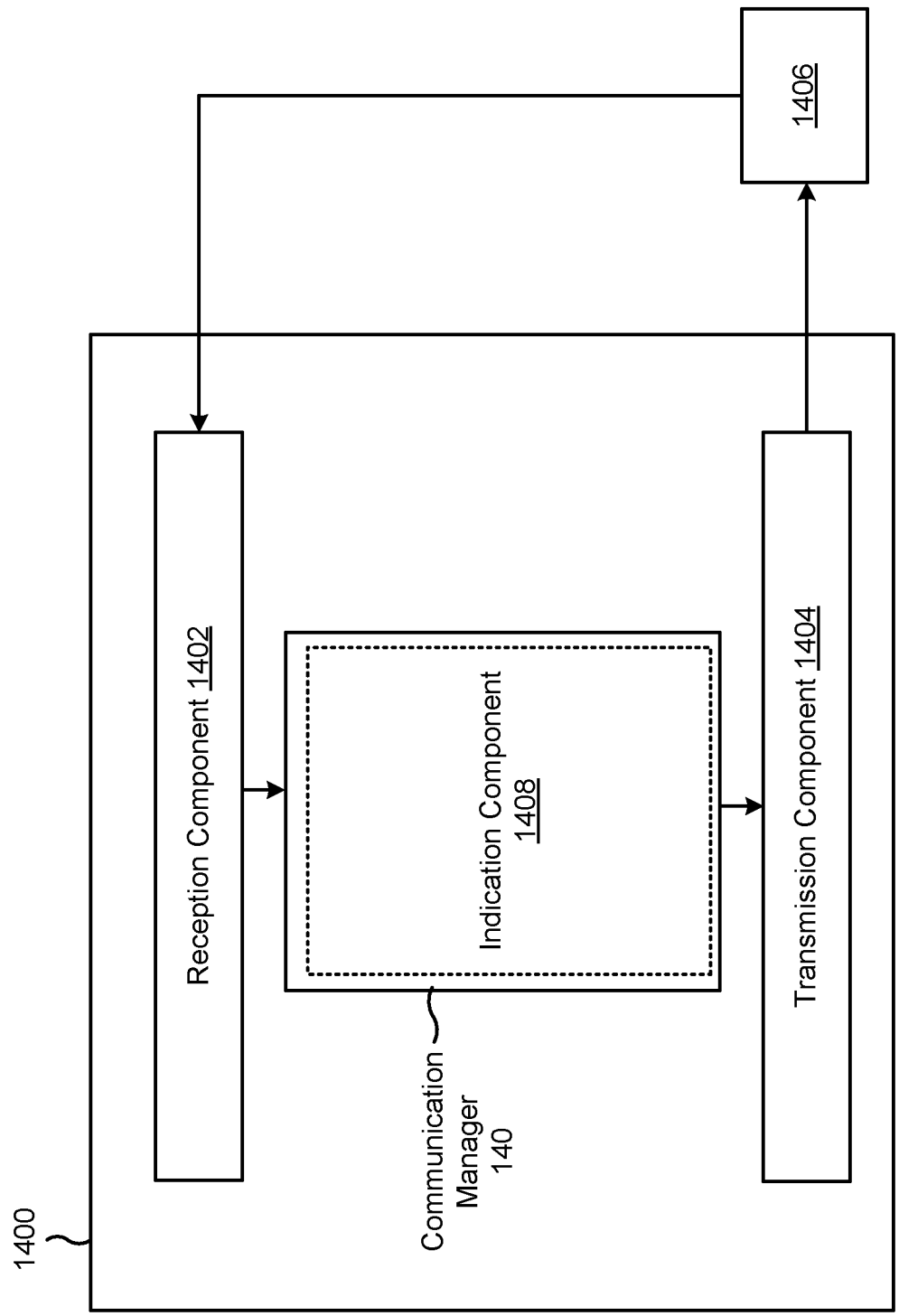
FIG. 14 is a diagram of an example apparatus for wireless communication, in accordance with the present disclosure.

FIG. 14 is a diagram of an example apparatus 1400 for wireless communication, in accordance with the present disclosure. The apparatus 1400 may be a UE, or a UE may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, or another wireless communication device) using the reception component 1402 and the transmission component 1404. As further shown, the apparatus 1400 may include the communication manager 140. The communication manager 140 may include an indication component 1408, among other examples.

In some aspects, the apparatus 1400 may be configured to perform one or more operations described herein in connection with FIGS. 3-11. Additionally, or alternatively, the apparatus 1400 may be configured to perform one or more processes described herein, such as process 1200 of FIG. 12, or a combination thereof. In some aspects, the apparatus 1400 and/or one or more components shown in FIG. 14 may include one or more components of the UE described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the UE described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the UE described in connection with FIG. 2. In some aspects, the transmission component 1404 may be co-located with the reception component 1402 in a transceiver.

The indication component 1408 may transmit an indication of whether a CG-PUSCH is to be transmitted, the indication being transmitted prior to a first configured symbol of the CG-PUSCH. The transmission component 1404 may transmit a communication in accordance with the indication.

The reception component 1402 may receive configuration information indicating the one or more time thresholds.

The transmission component 1404 may transmit capability signaling indicating a capability associated with the one or more time thresholds.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

Figure 15:
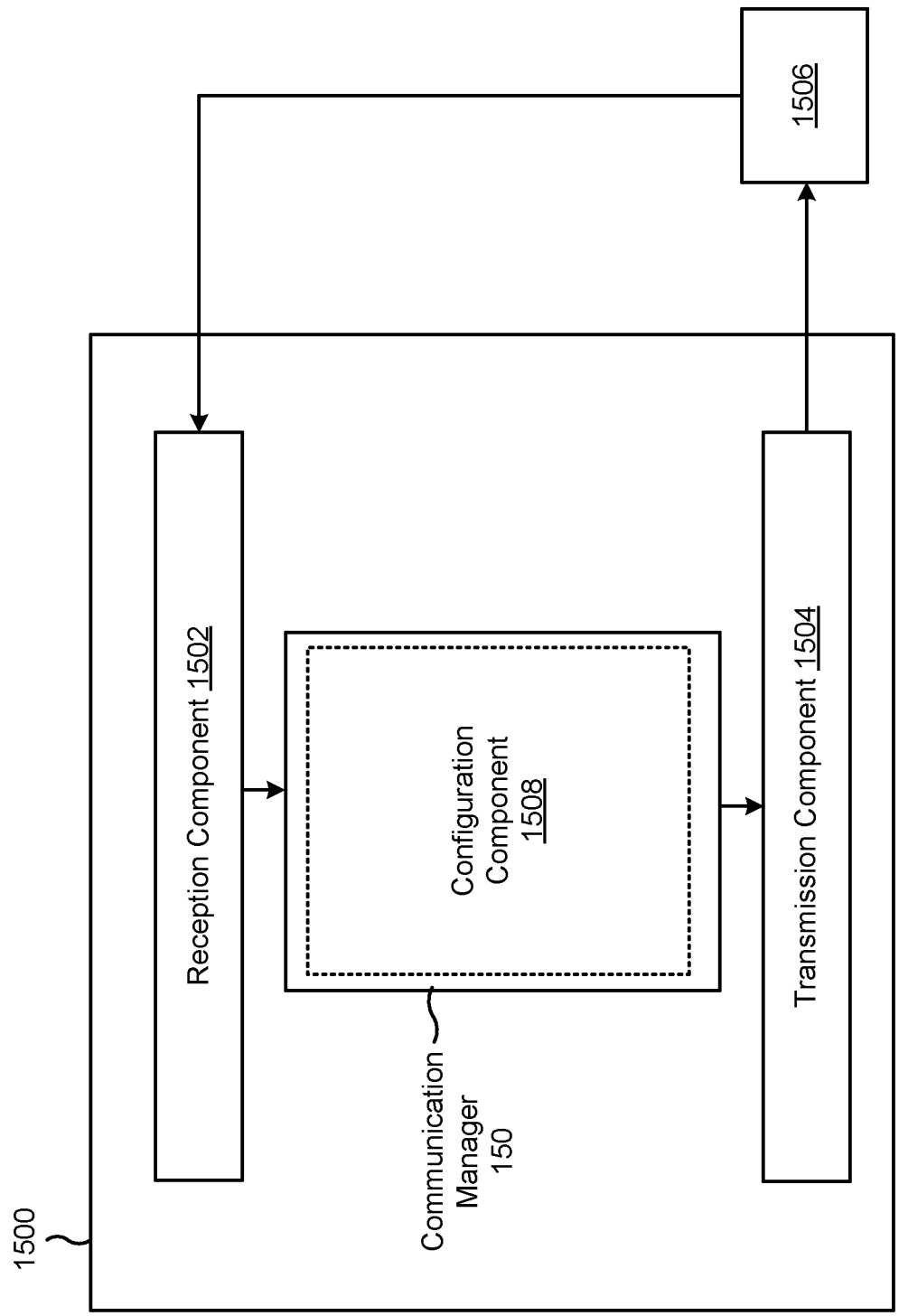
FIG. 15 is a diagram of an example apparatus for wireless communication, in accordance with the present disclosure.

FIG. 15 is a diagram of an example apparatus 1500 for wireless communication, in accordance with the present disclosure. The apparatus 1500 may be a network node, or a network node may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include the communication manager 150. The communication manager 150 may include one or more of a configuration component 1508, among other examples.

In some aspects, the apparatus 1500 may be configured to perform one or more operations described herein in connection with FIGS. 3-11. Additionally, or alternatively, the apparatus 1500 may be configured to perform one or more processes described herein, such as process 1300 of FIG. 13, or a combination thereof. In some aspects, the apparatus 1500 and/or one or more components shown in FIG. 15 may include one or more components of the network node described in connection with FIG. 2. Additionally, or alternatively, one or more components shown in FIG. 15 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1500. In some aspects, the reception component 1502 may include one or more antennas, a modem, a demodulator, a MIMO detector, a receive processor, a controller/processor, a memory, or a combination thereof, of the network node described in connection with FIG. 2.

The transmission component 1504 may transmit communications, such as reference signals, control information, data communications, or a combination thereof, to the apparatus 1506. In some aspects, one or more other components of the apparatus 1500 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modem, a modulator, a transmit MIMO processor, a transmit processor, a controller/processor, a memory, or a combination thereof, of the network node described in connection with FIG. 2. In some aspects, the transmission component 1504 may be co-located with the reception component 1502 in a transceiver.

The reception component 1502 may receive an indication of whether a CG-PUSCH is to be transmitted, the indication being received prior to a first configured symbol of the CG-PUSCH. The reception component 1502 may receive a communication in accordance with the indication.

The configuration component 1508 may transmit configuration information indicating the one or more time thresholds.

The reception component 1502 may receive capability signaling indicating a capability associated with the one or more time thresholds.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15.

The following provides an overview of some Aspects of the present disclosure:

Aspect 1: A method of wireless communication performed by a user equipment (UE), comprising: transmitting an indication of whether a configured grant physical uplink shared channel (CG-PUSCH) is to be transmitted, the indication being transmitted prior to a first configured symbol of the CG-PUSCH; and transmitting a communication in accordance with the indication.

Aspect 2: The method of Aspect 1, wherein the indication indicates that the CG-PUSCH is to be transmitted, and wherein transmitting the communication further comprises transmitting the communication using the CG-PUSCH.

Aspect 3: The method of Aspect 1, wherein the indication indicates that the CG-PUSCH is not to be transmitted, and wherein transmitting the communication further comprises transmitting the communication using a second uplink channel that overlaps the CG-PUSCH.

Aspect 4: The method of any of Aspects 1-3, wherein the indication is based at least in part on a scrambling sequence of a demodulation reference signal of a communication using a second uplink channel.

Aspect 5: The method of Aspect 4, wherein a first scrambling sequence indicates that the CG-PUSCH is to be transmitted and a second scrambling sequence indicates that the second uplink channel is to be transmitted.

Aspect 6: The method of any of Aspects 1-3, wherein the indication comprises uplink control information (UCI) that is provided on a second uplink channel.

Aspect 7: The method of Aspect 6, wherein the UCI is jointly encoded with hybrid automatic repeat request feedback on the second uplink channel.

Aspect 8: The method of Aspect 6, wherein the second uplink channel is rate matched around the uplink control information.

Aspect 9: The method of Aspect 6, wherein the uplink control information punctures the second uplink channel.

Aspect 10: The method of any of Aspects 1-9, where transmitting the indication further comprises: transmitting the indication in accordance with one or more time thresholds.

Aspect 11: The method of Aspect 10, wherein the one or more time thresholds include at least one of: a first threshold indicating a latest time at which the indication can be transmitted, or a second threshold indicating an earliest time at which the indication can be transmitted.

Aspect 12: The method of Aspect 10, further comprising: receiving configuration information indicating the one or more time thresholds.

Aspect 13: The method of Aspect 10, further comprising: transmitting capability signaling indicating a capability associated with the one or more time thresholds.

Aspect 14: The method of any of Aspects 1-3, wherein transmitting the indication further comprises: transmitting the indication via uplink control information on a configured uplink control channel resource.

Aspect 15: The method of Aspect 14, wherein the configured uplink control channel resource is associated with a first periodicity, and the CG-PUSCH is associated with a second periodicity equal to the first periodicity.

Aspect 16: The method of Aspect 14, wherein the configured uplink control channel resource includes multiple bit positions associated with indications for multiple CG-PUSCHs including the CG-PUSCH.

Aspect 17: The method of any of Aspects 1-3, wherein transmitting the indication further comprises: transmitting the indication in an occasion of the CG-PUSCH.

Aspect 18: The method of Aspect 17, wherein the occasion is a first occasion of the CG-PUSCH, wherein a second occasion of the CG-PUSCH overlaps with a second uplink channel, and wherein the indication indicates whether the CG-PUSCH is to be transmitted in the second occasion.

Aspect 19: The method of Aspect 17, wherein the indication comprises a bit appended to an uplink communication transmitted in the occasion.

Aspect 20: The method of Aspect 17, wherein the indication pertains to at least two occasions of the CG-PUSCH.

Aspect 21: A method of wireless communication performed by a network node, comprising: receiving an indication of whether a configured grant physical uplink shared channel (CG-PUSCH) is to be transmitted, the indication being received prior to a first configured symbol of the CG-PUSCH; and receiving a communication in accordance with the indication.

Aspect 22: The method of Aspect 21, wherein the indication indicates that the CG-PUSCH is to be transmitted, and wherein receiving the communication further comprises receiving the communication via the CG-PUSCH.

Aspect 23: The method of Aspect 21, wherein the indication indicates that the CG-PUSCH is not to be transmitted, and wherein receiving the communication further comprises receiving the communication using a second uplink channel that overlaps the CG-PUSCH.

Aspect 24: The method of any of Aspects 21-23, wherein the indication is based at least in part on a scrambling sequence of a demodulation reference signal of a communication using a second uplink channel.

Aspect 25: The method of Aspect 24, wherein a first scrambling sequence indicates that the CG-PUSCH is to be transmitted and a second scrambling sequence indicates that the second uplink channel is to be transmitted.

Aspect 26: The method of any of Aspects 21-25, wherein the indication comprises uplink control information (UCI) that is provided on a second uplink channel.

Aspect 27: The method of Aspect 26, wherein the UCI is jointly encoded with hybrid automatic repeat request feedback on the second uplink channel.

Aspect 28: The method of Aspect 26, wherein the second uplink channel is rate matched around the uplink control information.

Aspect 29: The method of Aspect 26, wherein the uplink control information punctures the second uplink channel.

Aspect 30: The method of any of Aspects 21-29, wherein the second uplink channel starts earlier than a first symbol of the CG-PUSCH.

Aspect 31: The method of any of Aspects 21-30, where receiving the indication further comprises: receiving the indication in accordance with one or more time thresholds.

Aspect 32: The method of Aspect 31, wherein the one or more time thresholds include at least one of: a first threshold indicating a latest time at which the indication can be transmitted, or a second threshold indicating an earliest time at which the indication can be transmitted.

Aspect 33: The method of Aspect 32, further comprising: transmitting configuration information indicating the one or more time thresholds.

Aspect 34: The method of Aspect 32, further comprising: receiving capability signaling indicating a capability associated with the one or more time thresholds.

Aspect 35: The method of any of Aspects 21-23, wherein receiving the indication further comprises: receiving the indication via uplink control information on a configured uplink control channel resource.

Aspect 36: The method of Aspect 35, wherein the configured uplink control channel resource is associated with a first periodicity, and the CG-PUSCH is associated with a second periodicity equal to the first periodicity.

Aspect 37: The method of Aspect 35, wherein the configured uplink control channel resource includes multiple bit positions associated with indications for multiple CG-PUSCHs including the CG-PUSCH.

Aspect 38: The method of any of Aspects 21-23, wherein receiving the indication further comprises: receiving the indication in an occasion of the CG-PUSCH.

Aspect 39: The method of Aspect 38, wherein the occasion is a first occasion of the CG-PUSCH, wherein a second occasion of the CG-PUSCH overlaps with a second uplink channel, and wherein the indication indicates whether the CG-PUSCH is to be transmitted in the second occasion.

Aspect 40: The method of Aspect 38, wherein the indication comprises a bit appended to an uplink communication in the occasion.

Aspect 41: The method of Aspect 38, wherein the indication indicates a whether a plurality of uplink channels pertaining to at least two occasions of the CG-PUSCH are transmitted.

Aspect 42: The method of any of Aspects 1-20, wherein transmitting the indication is based at least in part on the CG-PUSCH being associated with a first priority level, a second uplink channel overlapping the CG-PUSCH being associated with a second priority level, and the first priority level being higher than the second priority level.

Aspect 43: The method of Aspect 42, wherein the second uplink channel is one of: a physical uplink control channel, a lower priority CG-PUSCH, or a dynamic grant PUSCH.

Aspect 44: The method of any of Aspects 21-41, wherein transmitting the indication is based at least in part on the CG-PUSCH being associated with a first priority level, a second uplink channel overlapping the CG-PUSCH being associated with a second priority level, and the first priority level being higher than the second priority level.

Aspect 45: The method of Aspect 44, wherein the second uplink channel is one of: a physical uplink control channel, a lower priority CG-PUSCH, or a dynamic grant PUSCH.

Aspect 46: An apparatus for wireless communication at a device, comprising a processor; memory coupled with the processor; and instructions stored in the memory and executable by the processor to cause the apparatus to perform the method of one or more of Aspects 1-45.

Aspect 47: A device for wireless communication, comprising a memory and one or more processors coupled to the memory, the one or more processors configured to perform the method of one or more of Aspects 1-45.

Aspect 48: An apparatus for wireless communication, comprising at least one means for performing the method of one or more of Aspects 1-45.

Aspect 49: A non-transitory computer-readable medium storing code for wireless communication, the code comprising instructions executable by a processor to perform the method of one or more of Aspects 1-45.

Aspect 50: A non-transitory computer-readable medium storing a set of instructions for wireless communication, the set of instructions comprising one or more instructions that, when executed by one or more processors of a device, cause the device to perform the method of one or more of Aspects 1-45.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to:
      transmit an indication of whether a configured grant physical uplink shared channel (CG-PUSCH) is to be transmitted, the indication being transmitted prior to a first configured symbol of the CG-PUSCH; and
      transmit a communication in accordance with the indication.

2. The UE of claim 1, wherein the one or more processors, to transmit the indication, are configured to transmit the indication in an occasion of the CG-PUSCH.

3. The UE of claim 2, wherein the occasion is a first occasion of the CG-PUSCH, and wherein the indication indicates whether the CG-PUSCH is to be transmitted in a second occasion.

4. The UE of claim 2, wherein the indication comprises a bit appended to an uplink communication in the occasion.

5. The UE of claim 2, wherein the indication pertains to at least two occasions of the CG-PUSCH.

6. The UE of claim 1, wherein the one or more processors, to transmit the indication, are configured to transmit the indication on a PUSCH, associated with a configured grant, that starts earlier than the CG-PUSCH.

7. The UE of claim 1, wherein the indication indicates that the CG-PUSCH is to be transmitted, and wherein the one or more processors, to transmit the communication, are configured to transmit the communication using the CG-PUSCH.

8. The UE of claim 1, wherein the indication indicates that the CG-PUSCH is not to be transmitted, and wherein the one or more processors, to transmit the communication, are configured to transmit the communication using a second uplink channel that overlaps the CG-PUSCH.

9. The UE of claim 1, wherein the one or more processors, to transmit the indication, are configured to transmit the indication based at least in part on the CG-PUSCH being associated with a first priority level, a second uplink channel overlapping the CG-PUSCH being associated with a second priority level, and the first priority level being higher than the second priority level.

10. The UE of claim 1, wherein the indication comprises uplink control information (UCI) on a second uplink channel.

11. The UE of claim 10, wherein the UCI is jointly encoded with hybrid automatic repeat request feedback on the second uplink channel.

12. The UE of claim 10, wherein the UCI punctures the second uplink channel.

13. The UE of claim 1, where the one or more processors, to transmit the indication, are configured to transmit the indication in accordance with one or more time thresholds.

14. The UE of claim 13, wherein the one or more processors are further configured to receive configuration information indicating the one or more time thresholds.

15. The UE of claim 13, wherein the one or more processors are further configured to transmit capability signaling indicating a capability associated with the one or more time thresholds.

16. A network node for wireless communication, comprising:
one or more memories; and
one or more processors, coupled to the one or more memories, configured to:
receive an indication of whether a configured grant physical uplink shared channel (CG-PUSCH) is to be transmitted, the indication being received prior to a first configured symbol of the CG-PUSCH; and
receive a communication in accordance with the indication.

17. The network node of claim 16, wherein the one or more processors, to receive the indication, are configured to receive the indication in an occasion of the CG-PUSCH.

18. The network node of claim 17, wherein the occasion is a first occasion of the CG-PUSCH and wherein the indication indicates whether the CG-PUSCH is to be transmitted in a second occasion.

19. The network node of claim 16, wherein the indication indicates that the CG-PUSCH is to be transmitted, and wherein the one or more processors, to receive the communication, are configured to receive the communication via the CG-PUSCH.

20. The network node of claim 16, wherein the indication is based at least in part on a scrambling sequence of a demodulation reference signal of a communication using a second uplink channel.

21. The network node of claim 16, wherein the indication comprises uplink control information (UCI) on a second uplink channel.

22. The network node of claim 21, wherein the one or more processors, to receive the indication, are configured to receive the indication on a PUSCH, associated with a configured grant, that starts earlier than the CG-PUSCH.

23. A method of wireless communication performed by a user equipment (UE), comprising:
transmitting an indication of whether a configured grant physical uplink shared channel (CG-PUSCH) is to be transmitted, the indication being transmitted prior to a first configured symbol of the CG-PUSCH; and
transmitting a communication in accordance with the indication.

24. The method of claim 23, wherein the indication indicates that the CG-PUSCH is to be transmitted, and wherein transmitting the communication further comprises transmitting the communication using the CG-PUSCH.

25. The method of claim 23, wherein transmitting the indication further comprises:
transmitting the indication in an occasion of the CG-PUSCH.

26. A method of wireless communication performed by a network node, comprising:
receiving an indication of whether a configured grant physical uplink shared channel (CG-PUSCH) is to be transmitted, the indication being received prior to a first configured symbol of the CG-PUSCH; and
receiving a communication in accordance with the indication.

27. The method of claim 26, wherein the indication indicates that the CG-PUSCH is to be transmitted, and wherein receiving the communication further comprises receiving the communication via the CG-PUSCH.

28. The method of claim 26, wherein the indication indicates that the CG-PUSCH is not to be transmitted, and wherein receiving the communication further comprises receiving the communication using a second uplink channel that overlaps the CG-PUSCH.

29. The method of claim 26, wherein receiving the indication further comprises receiving the indication in an occasion of the CG-PUSCH.

30. The method of 26, wherein receiving the indication further comprises receiving the indication on a PUSCH, associated with a configured grant, that starts earlier than the CG-PUSCH.

* * * * *